(12) United States Patent
Kojima et al.

(10) Patent No.: US 12,151,540 B2
(45) Date of Patent: Nov. 26, 2024

(54) WINDSHIELD

(71) Applicant: NIPPON SHEET GLASS COMPANY, LIMITED, Tokyo (JP)

(72) Inventors: Tsutomu Kojima, Tokyo (JP); Masayuki Shiotsuka, Tokyo (JP); Hironori Kuribayashi, Tokyo (JP); Mitsunobu Yamada, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/267,322

(22) PCT Filed: Aug. 9, 2019

(86) PCT No.: PCT/JP2019/031616
§ 371 (c)(1),
(2) Date: Mar. 22, 2021

(87) PCT Pub. No.: WO2020/032250
PCT Pub. Date: Feb. 13, 2020

(65) Prior Publication Data
US 2021/0237540 A1    Aug. 5, 2021

(30) Foreign Application Priority Data
Aug. 10, 2018 (JP) .................. 2018-152061

(51) Int. Cl.
*B60J 1/00* (2006.01)
*B32B 3/26* (2006.01)
(Continued)

(52) U.S. Cl.
CPC .............. *B60J 1/001* (2013.01); *B32B 3/266* (2013.01); *B32B 7/12* (2013.01); *B32B 17/10* (2013.01);
(Continued)

(58) Field of Classification Search
CPC .... B60J 1/001; B60J 1/002; B60J 1/02; B32B 3/266; B32B 7/12; B32B 17/10;
(Continued)

(56) References Cited

U.S. PATENT DOCUMENTS

| | | | |
|---|---|---|---|
| 2004/0160688 A1* | 8/2004 | Noguchi | ............. B32B 17/1066 359/879 |
| 2019/0001629 A1 | 1/2019 | Laluet | |
| 2019/0315202 A1* | 10/2019 | Oya | ........................... B60J 1/02 |

FOREIGN PATENT DOCUMENTS

| | | |
|---|---|---|
| CN | 105925209 A | 9/2016 |
| JP | 2006-96331 A | 4/2006 |

(Continued)

OTHER PUBLICATIONS

Machine translation of JP 2018-020771 obtained from JPO on Sep. 13, 2022. (Year: 2018).*

(Continued)

*Primary Examiner* — Megha M Gaitonde
(74) *Attorney, Agent, or Firm* — Birch, Stewart, Kolasch & Birch, LLP

(57) ABSTRACT

The present invention provides a windshield on which an information acquisition device configured to acquire information from an outside of a vehicle by emitting and/or receiving light can be arranged, the windshield including: an outer glass plate; an inner glass plate; an interlayer arranged between the outer glass plate and the inner glass plate; a first blocking layer layered on a surface on the vehicle exterior side of the inner glass plate; and a second blocking layer layered on a surface on the vehicle interior side of the outer glass plate. The first blocking layer has an opening through which the light passes, and the second blocking layer is layered at a position where it blocks a portion of the opening, and the second blocking layer and the opening form a path through which the light passes.

16 Claims, 13 Drawing Sheets

(51) Int. Cl.
  *B32B 7/12* (2006.01)
  *B32B 17/10* (2006.01)
  *B60R 11/04* (2006.01)
  *B60R 11/00* (2006.01)

(52) U.S. Cl.
  CPC .. *B32B 17/10036* (2013.01); *B32B 17/10293* (2013.01); *B32B 17/10761* (2013.01); *B60J 1/002* (2013.01); *B60R 11/04* (2013.01); *B60R 2011/0026* (2013.01)

(58) Field of Classification Search
  CPC ........ B32B 17/10036; B32B 17/10293; B32B 17/10761; B60R 11/04; B60R 2011/0026
  See application file for complete search history.

(56) References Cited

FOREIGN PATENT DOCUMENTS

| | | |
|---|---|---|
| JP | 2006-327381 A | 12/2006 |
| JP | 2017-234059 A | 12/2017 |
| JP | 2018-20771 A | 2/2018 |
| JP | 2018020771 A * | 2/2018 |
| JP | WO2018/021498 A1 | 2/2018 |
| WO | WO 2015/170771 A1 | 11/2015 |
| WO | WO 2017/103427 A1 | 6/2017 |
| WO | WO 2017/155066 A1 | 9/2017 |
| WO | WO-2018016453 A1 * | 1/2018 ....... B32B 17/10036 |

OTHER PUBLICATIONS

International Search Report (PCT/ISA/210) issued in PCT/JP2019/031616 mailed on Sep. 10, 2019.
Written Opinion (PCT/ISA/237) issued in PCT/JP2019/031616 mailed on Sep. 10, 2019.
Extended European Search Report for European Application No. 19846322.6, dated Mar. 21, 2022.
Japanese Notice of Reasons for Refusal for Japanese Application No. 2020-535916, dated Nov. 29, 2022, with English translation.
Chinese Office Action and Search Report for Chinese Application No. 201980059071.X, dated May 8, 2024, with an English translation.

* cited by examiner

WINDSHIELD

TECHNICAL FIELD

The present invention relates to a windshield on which an information acquisition device for acquiring information from the outside of a vehicle by emitting and/or receiving light can be arranged.

BACKGROUND ART

In recent years, safety performance of automobiles has dramatically improved. In order to avoid a collision with a preceding vehicle, for example, a safety system is proposed in which the distance to the preceding vehicle and the speed of the preceding vehicle are detected and a brake automatically engages in an abnormal approach to the preceding vehicle. In such a system, the distance to the preceding vehicle and the like are measured using a laser radar or a camera. In general, a laser radar or a camera is arranged on the inner side of a windshield, and the measurements are performed by emitting light such as infrared rays forward (e.g., Patent Literature 1).

Also, a dark-colored blocking layer provided with an opening is layered on the windshield, and the opening formed in this blocking layer is used as the path through which light emitted from a camera or a radar passes. Also, a bracket is attached to a surface on the vehicle interior side of the windshield at a position thereof that corresponds to the blocking layer, and the above-described camera or the like is installed via this bracket. Therefore, the bracket, the camera, and the like are concealed from the outside of the vehicle by the blocking layer.

CITATION LIST

Patent Literature

Patent Literature 1: JP 2006-96331A

SUMMARY OF INVENTION

Technical Problem

Incidentally, the above-described blocking layer functions to conceal the bracket and camera from the outside of the vehicle, and also functions to prevent extra light from entering the camera and adjust the angle of view of the camera lens by adjusting the size of the opening. However, it is not easy to form a blocking layer that can sufficiently satisfy such requirements.

Note that such an issue may arise not only in cameras but also in information acquisition devices in general that acquire information from the outside of a vehicle by receiving light emitted by rain sensors, light sensors, and optical beacons, for example.

The present invention was made in order to resolve the foregoing issues, and it is an object thereof to provide a windshield that enables an information acquisition device to operate appropriately while preventing the information acquisition device from being seen from the outside of a vehicle.

Solution to Problem

Aspect 1. A windshield on which an information acquisition device configured to acquire information from an outside of a vehicle by emitting and/or receiving light can be arranged, the windshield including:
an outer glass plate;
an inner glass plate;
an interlayer arranged between the outer glass plate and the inner glass plate;
a first blocking layer layered on a surface on a vehicle interior side of the inner glass plate; and
a second blocking layer layered on a surface on a vehicle interior side of the outer glass plate;
in which the first blocking layer has an opening through which the light passes, and
the second blocking layer is layered at a position where it blocks a portion of the opening, and the second blocking layer and the opening form a path through which the light passes.

Aspect 2. The windshield according to Aspect 1,
in which the second blocking layer is formed extending in the up-down direction, and
the second blocking layer blocks a portion of the opening such that the shortest distance A between an upper side of the inner glass plate and an upper edge of the opening and the shortest distance B between the upper side of the inner glass plate and a lower edge of the second blocking layer satisfy A<B.

Aspect 3. The windshield according to Aspect 1 or 2,
in which the second blocking portion is layered at a position where it blocks an upper portion of the opening and at least a portion of two side portions of the opening.

Aspect 4. The windshield according to Aspect 1 or 2,
in which the second blocking portion is layered at a position where it blocks an inner peripheral edge portion of the opening.

Aspect 5. The windshield according to any of Aspects 1 to 4, further including
an antifog sheet attached to the surface on the vehicle interior side of the inner glass plate;
in which the antifog sheet is attached so as to cover at least a portion of the opening.

Aspect 6. The windshield according to any of Aspects 1 to 5,
in which the first blocking layer has an extension portion that extends downward from a vicinity of an upper side of the inner glass plate, and a lower end portion of the extension portion is provided with the opening, and
the second blocking layer is formed so as to be layered at a position corresponding to the extension portion and so as to block an upper portion of the opening.

Aspect 7. The windshield according to Aspects 5 to 6,
in which the antifog sheet is attached so as to overlap with at least a portion of a peripheral edge of the opening, and
the second blocking layer is layered at least at a position corresponding to the portion where the peripheral edge of the opening and the antifog sheet overlap with each other.

Aspect 8. The windshield according to Aspect 7,
in which the opening is formed into a rectangular shape, and
the antifog sheet is attached so as to overlap with at least an upper edge of the opening.

Aspect 9. The windshield according to any of Aspects 5 to 8,
in which the opening is formed into a rectangular shape, and the antifog sheet is arranged so as not to be in contact with two side edges of the opening.

Aspect 10. The windshield according to any of Aspects 5 to 8, in which the opening is formed into a rectangular shape, and the antifog sheet is attached so as to overlap with at least one of two side edges of the opening, the second blocking layer includes a pair of protruding portions that extend along the two sides of the opening, and the protruding portions are provided at positions corresponding to a portion where the antifog sheet and at least one of the two side edges of the opening overlap with each other.

Aspect 11. The windshield according to any of Aspects 1 to 10, in which the first blocking layer has an extension portion that extends downward from a vicinity of an upper side of the inner glass plate, and a lower end portion of the extension portion is provided with the opening, and a width of the second blocking layer is less than or equal to a width of the extension portion of the first blocking layer.

Aspect 12. The windshield according to any of Aspects 1 to 11, further including a bracket to which the information acquisition device is attachable and that is attached to the surface on the vehicle interior side of the inner glass plate, in which the bracket is formed into a frame shape having a through-hole portion surrounding the opening, and the antifog sheet is arranged in the through-hole portion.

Aspect 13. The windshield according to any of Aspects 5 to 12, in which the antifog sheet includes a base member, an antifog layer layered on one surface of the base member, and an adhesive layer that is layered on another surface of the base member and is attached to the inner glass plate.

Aspect 14. The windshield according to any of Aspects 1 to 13, in which an attachment angle of the windshield attached to a vehicle relative to a vertical direction is 45 degrees or less.

Aspect 15. The windshield according to any of Aspects 1 to 14, in which linear expansion coefficients of the glass plates and linear expansion coefficients of the blocking layers are different from each other, and the amount of warping occurring in a vicinity of an edge portion of the first blocking layer in the inner glass plate is smaller than the amount of warping occurring in a vicinity of an edge portion of the second blocking layer in the outer glass plate.

Advantageous Effects of Invention

According to the present invention, it is an object to provide a windshield that enables an information acquisition device to operate appropriately while preventing the information acquisition device from being seen from the outside of a vehicle.

DESCRIPTION OF EMBODIMENTS

Figure 1:
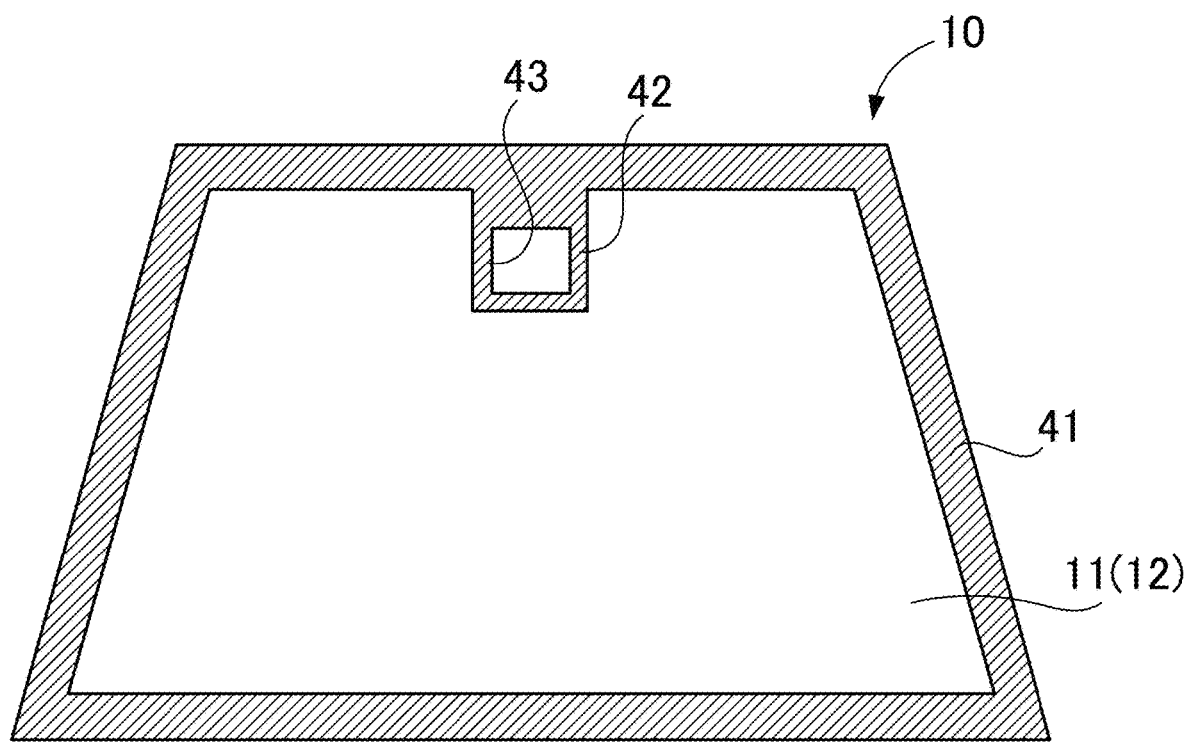
FIG. 1 is a plan view showing one embodiment of a windshield according to the present invention.
Figure 2:
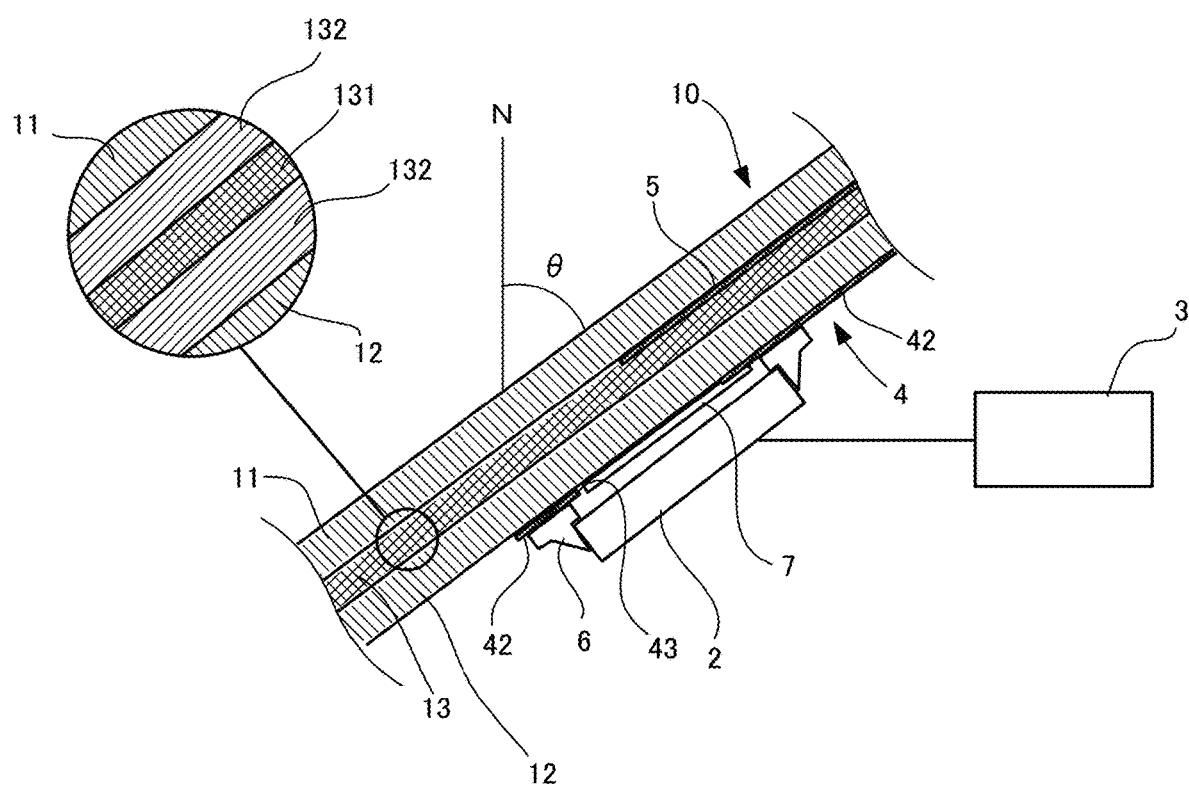
FIG. 2 is a cross-sectional view of FIG. 1.

First, the configuration of a windshield according to this embodiment will be described using FIGS. 1 and 2. FIG. is a plan view of the windshield, and FIG. 2 is a cross-sectional view of FIG. 1. Note that the "up-down direction" in FIG. 1 refers to "upper and lower", "perpendicular", and "vertical", and the "left-right direction" in FIG. 1 refers to "horizontal" for convenience of description. FIG. 1 illustrates a windshield as viewed from the vehicle interior side. That is to say, the back side of the paper plane of FIG. 1 refers to the vehicle exterior side, and the front side of the paper plane of FIG. 1 refers to the vehicle interior side.

This windshield is provided with a trapezoidal laminated glass 10, and is installed in a vehicle body in an inclined state. The laminated glass 10 includes an outer glass plate 11, an inner glass plate 12, and an interlayer 13 arranged between the outer glass plate 11 and the inner glass plate 12. Also, a first blocking layer 4 and a second blocking layer 5 are respectively layered on a surface on the vehicle interior side of the inner glass plate 12 and a surface on the vehicle interior side of the outer glass plate 11, and the field of view is blocked by these blocking layers 4 and 5. Also, the first blocking layer 4 is provided with an opening 43, and images of the outside of the vehicle can be taken by an imaging device arranged inside the vehicle via this opening 43. A frame-shaped bracket 6 is fixed onto the first blocking layer 4 of the inner glass plate 12, and the imaging device 2 is attached to this bracket 6. Because the bracket 6 is fixed onto the first blocking layer 4, the bracket 6 is concealed from the outside of the vehicle. Furthermore, an antifog sheet 7 is attached to the inner glass plate 12 so as to cover the opening 43. Hereinafter, constituent elements will be described in detail.

1. LAMINATED GLASS

Figure 3:
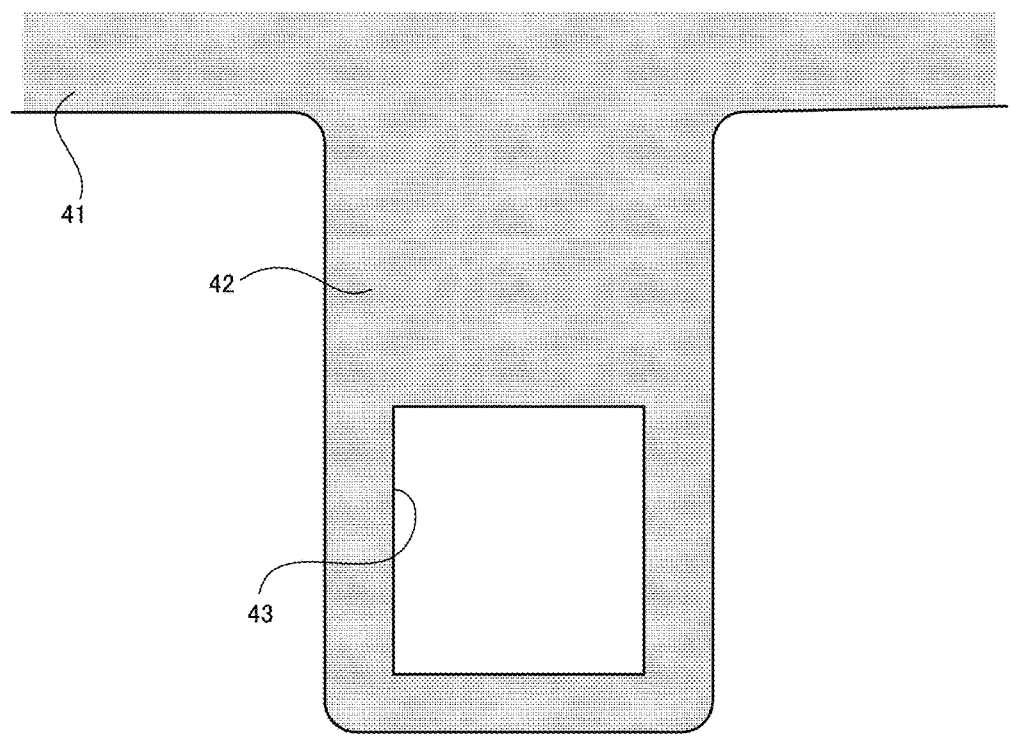
FIG. 3 is a plan view of a first blocking layer.

FIG. 3 is a cross-sectional view of a laminated glass. As shown in FIG. 3, this laminated glass 10 includes an outer glass plate 11 and an inner glass plate 12, and a resin interlayer 13 is arranged between the glass plates 11 and 12. Hereinafter, the configuration thereof will be described.

1-1. Glass Plate

First, the outer glass plate 11 and the inner glass plate 12 will be described. Known glass plates can be used as the outer glass plate 11 and the inner glass plate 12, and these glass plates can also be made of heat-ray absorbing glass, regular clear glass or green glass, or UV green glass. However, the glass plates 11 and 12 are required to attain a visible light transmittance that conforms to the safety standards of a country in which the automobile is to be used. An adjustment can be made so that the outer glass plate 11 ensures a required solar absorptance and the inner glass plate 12 provides a visible light transmittance that meets the safety standards, for example. An example of clear glass, an example of heat-ray absorbing glass, and an example of soda-lime based glass are shown below.

Clear Glass
  $SiO_2$: 70 to 73 mass %
  $Al_2O_3$: 0.6 to 2.4 mass %
  CaO: 7 to 12 mass %
  MgO: 1.0 to 4.5 mass %
  $R_2O$: 13 to 15 mass % (R represents an alkali metal)
  Total iron oxide (T-$Fe_2O_3$) in terms of $Fe_2O_3$: 0.08 to 0.14 mass %

Heat-Ray Absorbing Glass

With regard to the composition of heat-ray absorbing glass, a composition obtained based on the composition of clear glass by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the components (mainly $SiO_2$ and $Al_2O_3$) forming the framework of glass by an amount corresponding to the increases in T-$Fe_2O_3$, $CeO_2$, and $TiO_2$ can be used, for example.

Soda-Lime Based Glass
  $SiO_2$: 65 to 80 mass %
  $Al_2O_3$: 0 to 5 mass %
  CaO: 5 to 15 mass %
  MgO: 2 mass % or more
  NaO: 10 to 18 mass %
  $K_2O$: 0 to 5 mass %
  MgO+CaO: 5 to 15 mass %
  $Na_2O+K_2O$: 10 to 20 mass %
  $SO_3$: 0.05 to 0.3 mass %
  $B_2O_3$: 0 to 5 mass %
  Total iron oxide (T-$Fe_2O_3$) in terms of $Fe_2O_3$: 0.02 to 0.03 mass %

Although there is no particular limitation on the thickness of the laminated glass 10 according to this embodiment, it is possible to set the total thickness of the outer glass plate 11 and the inner glass plate 12 to 2.1 to 6 mm, for example, and, from the viewpoint of weight reduction, the total thickness of the outer glass plate 11 and the inner glass plate 12 is preferably set to 2.4 to 3.8 mm, more preferably 2.6 to 3.4 mm, and particularly preferably 2.7 to 3.2 mm. As described above, there is a need to reduce the total thickness of the outer glass plate 11 and the inner glass plate 12 in order to reduce the weight. Therefore, although there is no particular limitation on the thicknesses of the glass plates, the thicknesses of the outer glass plate 11 and the inner glass plate 12 can be determined as described below, for example.

The outer glass plate 11 is mainly required to have durability and impact resistance against external interference. When this glass plate is used as a windshield of an automobile, impact-resistance against flying objects such as small stones is required. On the other hand, a larger thickness is not preferable because the weight increases. From this viewpoint, the thickness of the outer glass plate 11 is preferably 1.8 to 2.3 mm, and more preferably 1.9 to 2.1 mm. The thickness to be used can be determined in accordance with the application of the glass plate.

Although the thickness of the inner glass plate 12 can be made equal to that of the outer glass plate 11, the thickness of the inner glass plate 12 can be made smaller than that of the outer glass plate 11 in order to reduce the weight of the laminated glass 10, for example. Specifically, when the strength of the glass plate is taken into consideration, the thickness is preferably 0.6 to 2.0 mm, more preferably 0.8 to 1.6 mm, and particularly preferably 1.0 to 1.4 mm. Furthermore, the thickness is preferably 0.8 to 1.3 mm. With regard to the inner glass plate 12 as well, the thickness to be used can be determined in accordance with the application of the glass plate.

Here, an example of a method of measuring the thickness of a curved glass plate (laminated glass) 1 will be described. First, with respect to the measurement position, the measurement is performed at two positions: an upper position and a lower position on a center line S extending vertically through the center of a glass plate in the horizontal direction. Although there is no particular limitation on the measuring apparatus, a thickness gauge such as SM-112 manufactured by TECLOCK Corporation can be used, for example. During measurement, the glass plate is arranged such that the curved surface of the glass plate is placed on a flat surface, and an end portion of the glass plate is sandwiched by and measured with the above-mentioned thickness gauge. Note that a flat glass plate can also be measured in the same manner as a curved glass plate.

1-2. Interlayer

The interlayer 13 includes at least one layer. For example, as shown in FIG. 3, the interlayer 13 can be configured by three layers, namely a soft core layer 131 and outer layers 132 that are harder than the core layer 131 and between which the core layer 131 is sandwiched. However, there is no limitation to this configuration, and it is sufficient that the interlayer 13 includes a plurality of layers including the core layer 131 and at least one outer layer 132 arranged on the outer glass plate 11 side. For example, the interlayer 13 including two layers, namely the core layer 131 and one outer layer 132 arranged on the outer glass plate 11 side, or the interlayer 13 in which an even number of two or more of the outer layers 132 are arranged on each side of the core layer 131 so that the core layer 131 is arranged at the center, or the interlayer 13 in which an odd number of outer layers 132 are arranged on one side of the core layer 131 and an even number of outer layers 132 are arranged on the other side so that the core layer 131 is sandwiched therebetween can also be formed. Note that in the case where only one outer layer 132 is provided, the outer layer 132 is provided on the outer glass plate 11 side as mentioned above, which is for the purpose of improving the breakage resistance performance with respect to an external force from the outside of a vehicle or a building. Also, when the number of outer layers 132 is increased, the sound insulation performance is improved.

There is no particular limitation on the hardness of the core layer 131 as long as the core layer 131 is softer than the outer layer 132. Although there is no particular limitation on the materials constituting the layers 131 and 132, it is possible to select materials based on the Young's modulus, for example. Specifically, at a frequency of 100 Hz and a temperature of 20° C., the Young's modulus is preferably 1 to 20 MPa, more preferably 1 to 18 MPa, and particularly preferably 1 to 14 MPa. When the Young's modulus is set to be in such a range, it is possible to prevent a decrease in sound transmission loss (STL) in a low frequency range of about 3500 Hz or lower. On the other hand, as will be described later, it is preferable that the outer layers 132 have a large Young's modulus for the purpose of improving the sound insulation performance in a high frequency range, and the Young's modulus can be set to 560 MPa or more, 600 MPa or more, 650 MPa or more, 700 MPa or more, 750 MPa or more, 880 MPa or more, or 1300 MPa or more at a frequency of 100 Hz and a temperature of 20° C. There is no particular limitation on the upper limit of the Young's modulus of each of the outer layers 132, but the Young's modulus can be set from the viewpoint of workability, for example. It is empirically known that when the Young's modulus is set to 1750 MPa or more, for example, the workability decreases, and in particular, cutting is difficult.

Also, the outer layers 132 can be made of a polyvinyl butyral resin (PVB) as a specific material, for example. Polyvinyl butyral resin has excellent adhesiveness to the glass plates and penetration resistance and is thus preferable. On the other hand, the core layer 131 can be made of an ethylene vinyl acetate resin (EVA) or a polyvinyl acetal resin, which is softer than the polyvinyl butyral resin constituting the outer layers. When the soft core layer is sandwiched between the outer layers, the sound insulation performance can be significantly improved while keeping adhesiveness and penetration resistance that are equivalent to those of a single-layered resin interlayer.

In general, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer to be added, and the like. Accordingly, a hard polyvinyl butyral resin that is used for the outer layers 132 and a soft polyvinyl butyral resin that is used for the core layer 131 can be produced with the same polyvinyl butyral resin by appropriately adjusting at least one condition selected from the aforementioned conditions. Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin, the softer the resulting polyvinyl acetal resin tends to be. Accordingly, for example, if the outer layers 132 are made of a polyvinyl butyral resin, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer 131. Note that there is no limitation to the above-mentioned resins and the like as long as predetermined Young's moduli can be obtained.

The total thickness of the interlayer 13 is not particularly specified, but is preferably 0.3 to 6.0 mm, more preferably 0.5 to 4.0 mm, and particularly preferably 0.6 to 2.0 mm. Also, the thickness of the core layer 131 is preferably 0.1 to 2.0 mm and more preferably 0.1 to 0.6 mm. Meanwhile, the thickness of each of the outer layers 132 is preferably 0.1 to 2.0 mm and more preferably 0.1 to 1.0 mm. Alternatively, it is also possible to fix the total thickness of the interlayer 13 and adjust the thickness of the core layer 131 without exceeding the fixed total thickness.

The thicknesses of the core layer 131 and the outer layers 132 can be measured as described below, for example. First, the cross section of a laminated glass is enlarged by a factor of 175 and displayed using a microscope (e.g., VH-5500 manufactured by Keyence Corporation). Then, the thicknesses of the core layer 131 and the outer layers 132 are visually identified and measured. At this time, in order to eliminate variations seen in visual identification, the measurement is performed five times, and average values are taken as the thicknesses of the core layer 131 and the outer layers 132. For example, an enlarged photograph of a cross-section of a laminated glass is taken, in which the core layer and the outer layers 132 have been identified, and the thicknesses of the identified core layer and outer layers 132 are measured.

Note that the core layer 131 and the outer layers 132 of the interlayer 13 are not required to have a constant thickness over the entire surface. For example, the core layer 131 and the outer layers 132 can also have a wedge shape so as to be suited to a laminated glass that is used for a head-up display. In this case, the thicknesses of the core layer 131 and the outer layers 132 of the interlayer 13 are measured at positions having the smallest thickness, that is, in the lowest side portion of the laminated glass. If the interlayer 13 has a wedge shape, the outer glass plate and the inner glass plate are not arranged in parallel, but it should be construed that such an arrangement is also included in the arrangement of the glass plates of the present invention. That is, the arrangement according to the present invention includes the arrangement of the outer glass plate and the inner glass plate when the interlayer 13 including the core layer 131 and the outer layers 132 whose thicknesses increase at a rate of change of 3 mm or less per meter is used, for example.

Although there is no particular limitation on the method of manufacturing the interlayer 13, examples thereof include a method in which a resin component, such as the above-described polyvinyl acetal resin, a plasticizer, and other additives, if necessary, are mixed and uniformly kneaded, and then the layers are collectively extruded, and a method in which two or more resin films that are produced using this method are laminated with a pressing process, a lamination process, or the like. In the method of laminating with the pressing process, the lamination process, or the like, each of the resin films before laminating may have a single-layer structure or a multilayer structure. Also, the interlayer 13 may include a single layer instead of the plurality of layers as mentioned above.

2. OVERVIEW OF BLOCKING LAYER, ANTIFOG SHEET, AND BRACKET

Next, the blocking layers 4 and 5 will be described. As described above, two blocking layers, namely, the first blocking layer 4 and the second blocking layer 5, are used in this embodiment. First, the first blocking layer 4 will be described.

As shown in FIG. 3, the first blocking layer 4 layered on a surface on the vehicle interior side of the inner glass plate 12 includes a peripheral edge portion 41 layered along the entire peripheral edge of the inner glass plate 12, and a rectangular extension portion 42 that is connected to the peripheral edge portion 41 and extends downward from the vicinity of the center of the upper side of the inner glass plate 12. The lower end portion of the extension portion 42 is provided with a rectangular opening 43, and the imaging device 2 attached onto the vehicle interior side is capable of taking images of the outside of the vehicle via this opening 43 and the laminated glass 10.

Figure 4:
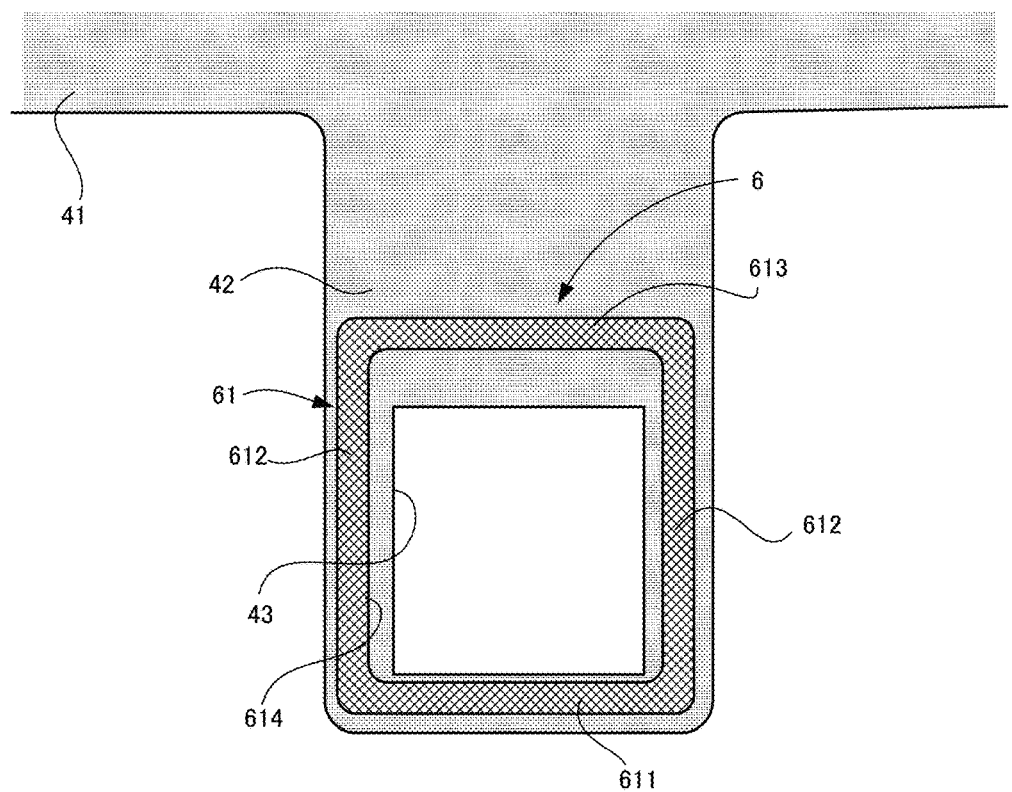
FIG. 4 is a plan view showing a state in which a bracket is attached to the first blocking layer shown in FIG. 3.

As shown in FIG. 4, the above-described bracket 6 is fixed onto the first blocking layer 4. Specifically, the bracket 6 includes a frame-shaped support portion 61 having a rectangular outer shape. The support portion 61 includes a lower end portion 611, two side portions 612, and an upper end portion 613 that are respectively attached to the lower edge side, two side-edge sides, and upper edge side of the opening 43 in the extension portion 42 of the first blocking layer 4, and the space surrounded by these portions constitutes a rectangular through-hole portion 614. The surface of the support portion 61 that is fixed to the first blocking layer 4 is flat, and is fixed to the first blocking layer 4, using double-sided tape, an adhesive, or the like. On the other hand, a fixing tool (not shown) for fixing the imaging device 2 is attached to a surface of the support portion 61 that faces the vehicle interior side.

The lower end portion 611, the two side portions 612, and the upper end portion 613 of the support portion 61 are fixed so as not to protrude from the first blocking layer 4 such that the lower end portion 611, the two side portions 612, and the upper end portion 613 are concealed from the outside of the vehicle. Therefore, the through-hole portion 614 is formed larger than the opening 43.

Figure 5:
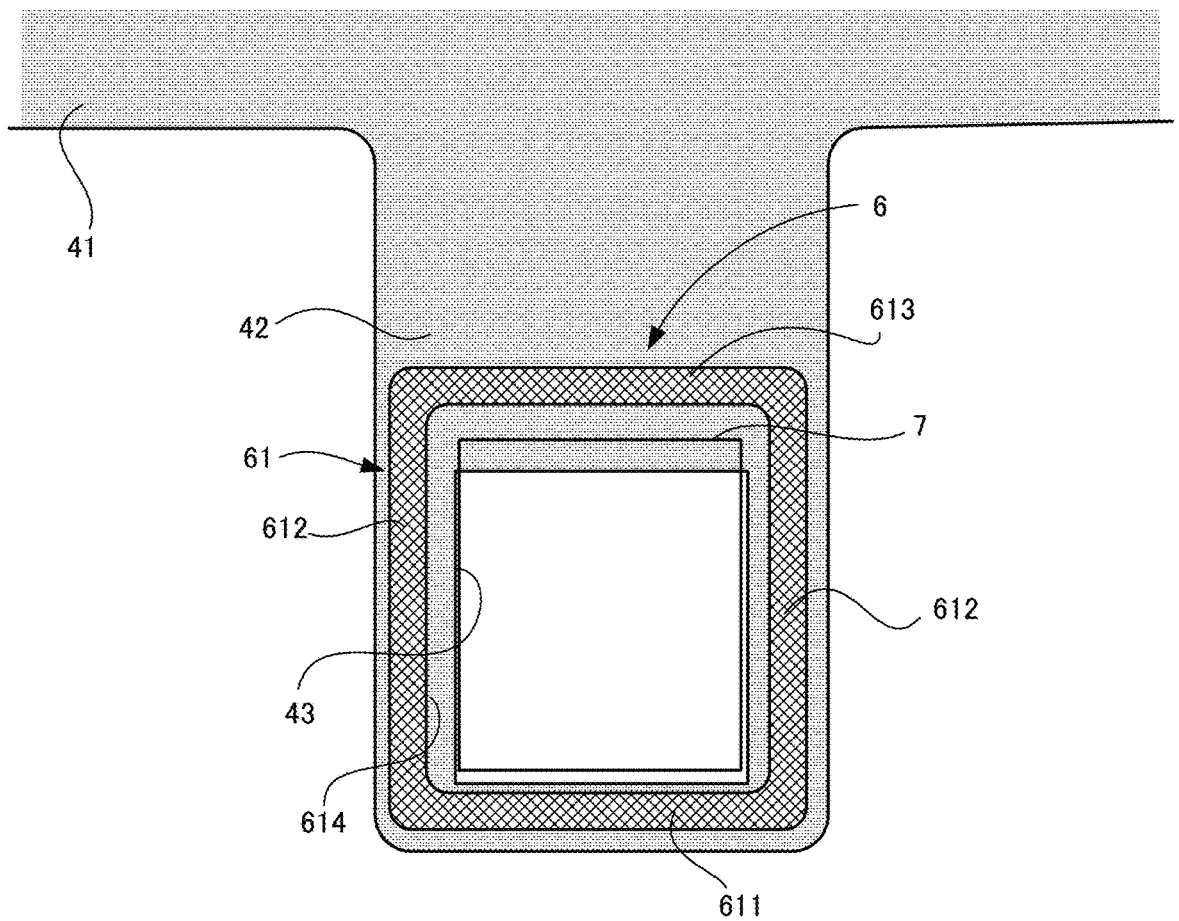
FIG. 5 is a plan view showing a state in which an antifog sheet is attached to the first blocking layer shown in FIG. 4.

Next, the shape and position of the antifog sheet 7 will be described. Note that the composition and the like of the antifog sheet 7 will be described later in detail. The antifog sheet 7 is attached to the inner glass plate 12 and the first blocking layer 4 so as to cover the opening 43. Specifically, as shown in FIG. 5, the length of the antifog sheet 7 in the width direction is slightly shorter than the length of the opening 43 in the width direction, and accordingly, the two side edges of the antifog sheet 7 are attached so as not to come into contact with the first blocking layer 4. While the lower edge of the antifog sheet 7 extends to the vicinity of the lower edge of the opening 43, the upper edge of the antifog sheet 7 extends past the upper edge of the opening 43 and overlaps with the first blocking layer 4. However, the upper edge of the antifog sheet 7 is of a size that is to be fitted into the through-hole portion 614 in the bracket 6, and does not come into contact with the upper end portion 613 of the bracket 6.

Figure 6:
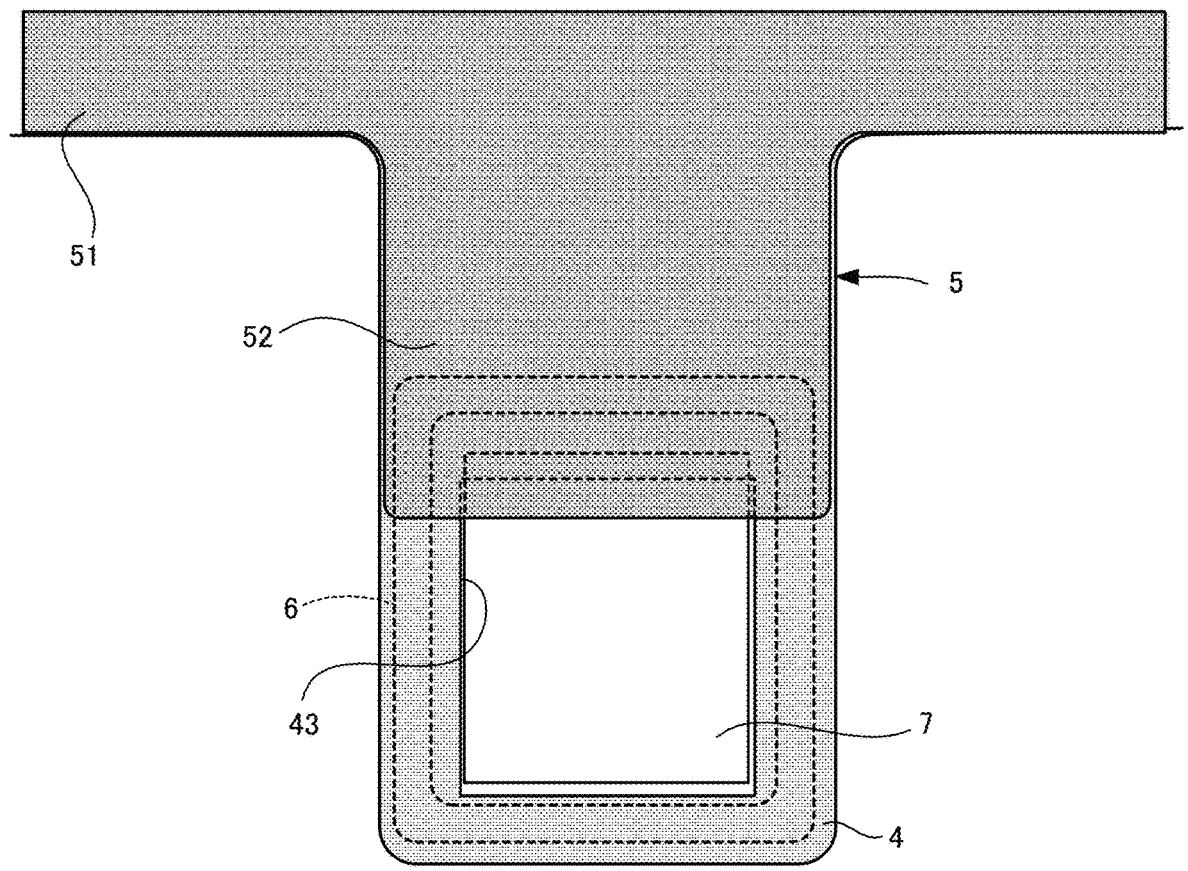
FIG. 6 is a partially enlarged plan view of the windshield as viewed from the vehicle exterior side.

Next, the second blocking layer 5 will be described. As shown in FIG. 6, similarly to the first blocking layer, the second blocking layer 5 includes a peripheral edge portion 51 layered along the entire peripheral edge of the inner glass plate 12, and a rectangular extension portion 52 that is connected to the peripheral edge portion 51 and extends downward from the vicinity of the center of the upper side of the inner glass plate 12. The position and the size of the peripheral edge portion 51 of the second blocking layer 5 are substantially the same as those of the peripheral edge portion 41 of the first blocking layer 4, and the peripheral edge portion 51 is arranged overlapping with the peripheral edge portion 41. Similarly, the extension portion 52 of the second blocking layer 5 is also formed at the same position as the extension portion 42 of the first blocking layer 4, but the extension portion 52 and the extension portion 42 have different lengths in the up-down direction. That is, the lower edge portion of the extension portion 52 of the second blocking layer 5 extends to a position where the lower edge portion covers the portion where the first blocking layer 4 and the antifog sheet 7 overlap with each other (referred to as "overlapping portion" hereinafter). That is, the second blocking layer 5 is arranged at a position overlapping with a portion of the upper portion of the opening 43. More specifically, the second blocking layer is arranged such that the shortest distance A from the upper side of the inner glass plate 12 to the upper side (upper edge) of the opening 43 and the shortest distance B from the upper side of the inner glass plate 12 to the lower edge of the second blocking layer 5 satisfy at least A<B.

Next, the materials of the blocking layers 4 and 5 will be described. The materials of the blocking layers 4 and 5 may be selected as appropriate according to embodiments as long as they can block the field of view from the outside of the vehicle, and a ceramic material with a dark color such as black, brown, gray, or dark blue may be used, for example. Note that, although the colors of the blocking layers 4 and 5 are different from each other in the example shown in FIG. 6 and the like, this is for convenience of description, and the blocking layers 4 and 5 may have the same color.

If a black ceramic material is selected as the material of the blocking layers 4 and 5, for example, the black ceramic material is layered on the inner surface of the inner glass plate 12 and the inner surface of the outer glass plate 11 through screen printing or the like, and the layered ceramic materials are heated together with the glass plates 11 and 12. Then, when the resulting ceramic material is hardened, the blocking layers 4 and 5 are complete. Note that various materials can be used as the ceramic material used for the blocking layers 4 and 5. It is possible to use a ceramic material with a composition shown in Table 1 below for the blocking layers 4 and 5, for example.

TABLE 1

|  |  | First and second color ceramic paste |
|---|---|---|
| Pigment*1 | mass % | 10 |
| Resin (cellulosic resin) | mass % | 10 |
| Organic solvent (pine oil) | mass % | 10 |
| Glass binder*2 | mass % | 70 |
| Viscosity | dPs | 150 |

*1, main components: copper oxide, chromium oxide, iron oxide, and manganese oxide
*2, main components : bismuth borosilicate and zinc borosilicate

3. IN-VEHICLE SYSTEM

Figure 7:
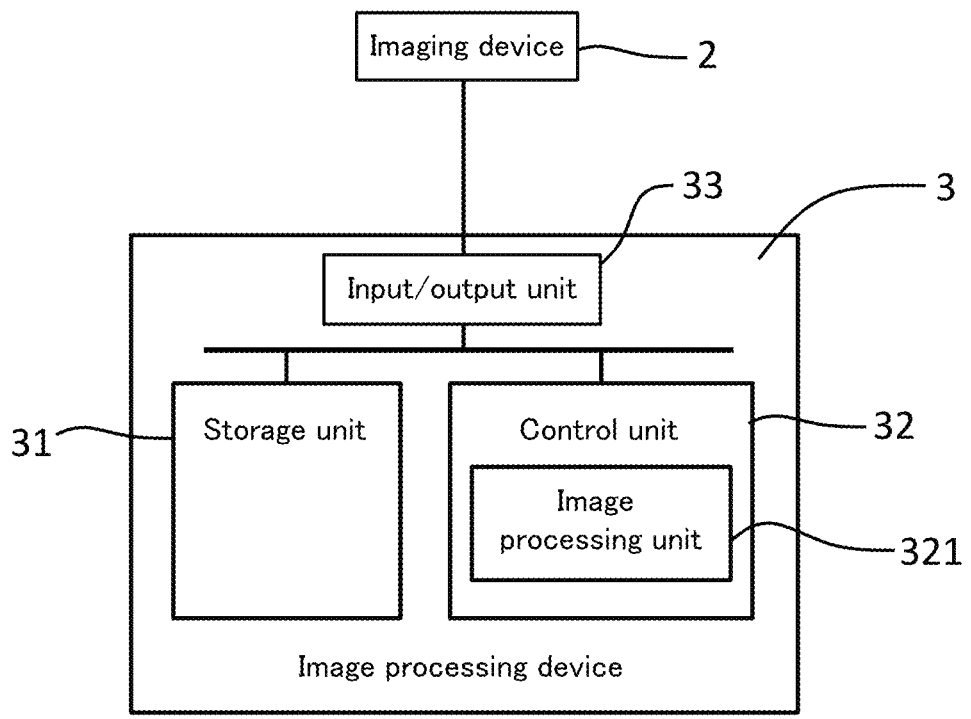
FIG. 7 is a block diagram showing a schematic configuration of an in-vehicle system.

Next, an in-vehicle system provided with the imaging device 2 and the image processing device 3 will be described using FIG. 2. FIG. 7 shows the configuration of the in-vehicle system. As shown in FIG. 7, the in-vehicle system according to this embodiment includes the above-described imaging device 2 and the above-described image processing device 3 connected to the imaging device 2.

The image processing device 3 is a device for processing images taken by the imaging device 2. This image processing device 3 includes general hardware such as a storage unit 31, a control unit 32, and an input/output unit 33 that are connected via a busbar, as a hardware configuration, for example. However, the hardware configuration of the image processing device 3 is not limited to such an example, and, with regard to a specific hardware configuration of the image processing device 3, it is possible to add, or omit and add constituent elements as appropriate according to an embodiment.

The storage unit 31 stores various data and programs used in processing executed by the control unit 32 (not shown). The storage unit 31 may be realized by a hard disk, or a recording medium such as a USB memory, for example. Also, various data and programs stored in the storage unit 31 may be acquired from a recording medium such as a CD (Compact Disc) or a DVD (Digital Versatile Disc). Furthermore, the storage unit 31 may be referred to as an "auxiliary storage".

As described above, the laminated glass 10 is arranged in an inclined orientation with respect to the vertical direction, and is curved. Also, the imaging device 2 takes images of the outside of a vehicle via such a laminated glass 10. Thus, the images taken by the imaging device 2 are deformed according to the orientation, shape, refractive index, optical defects, and the like of the laminated glass 10. Aberrations that are specific to the camera lens of the imaging device 2 also cause deformation. In view of this, the storage unit 31 may store correction data for correcting images that are deformed due to aberrations of the laminated glass 10 and the camera lens.

The control unit 32 includes one or more processors such as a microprocessor or a CPU (Central Processing Unit), and peripheral circuits (a ROM (Read Only Memory), a RAM (Random Access Memory), an interface circuit, and the like) used for processing performed by these processors. The ROM, the RAM, and the like may be called the main storages in the sense that they are located in the address space handled by the processors in the control unit 32. The control unit 32 functions as an image processing unit 321 by executing various data and programs stored in the storage unit 31.

The image processing unit 321 processes images taken by the imaging device 2. Processing performed on the captured images can be selected as appropriate according to an embodiment. The image processing unit 321 may recognize a subject present in a captured image by analyzing the captured image through pattern matching or the like, for example. In this embodiment, in order that the imaging device 2 takes images of situation forward of the vehicle, the image processing unit 321 may further determine whether or not an organism such as a human being is present on the forward side of the vehicle based on this subject recognition. Then, if a person is present on the forward side of the vehicle, the image processing unit 321 may output a warning message, using a predetermined method. Also, the image processing unit 321 may perform a predetermined process on a captured image, for example. Then, the image processing unit 321 may output the processed captured image to a display device (not shown) such as a display connected to the image processing device 3.

The input/output unit 33 is one or more interfaces for transmitting and receiving data to/from a device that is present outside the image processing device 3. The input/output unit 33 is an interface for connecting to a user interface, or an interface of a USB (Universal Serial Bus), for example. Note that the image processing device 3 is connected to the imaging device 2 via the input/output unit 33, and acquires images taken by the imaging device 2 in this embodiment.

In addition to a device designed exclusively for a service to be provided, a general-purpose device such as a PC (Personal Computer) or a tablet terminal may be used as such an image processing device 3.

Also, as described above, the imaging device 2 is attached to the bracket 6. Therefore, attachment of the imaging device 2 to the bracket 6 and attachment of the bracket to the first blocking layer 4 are adjusted such that the optical axis of the camera lens of the imaging device 2 passes through the opening 43 in this state. Also, a cover (not shown) is attached to the bracket 6 so as to cover the imaging device 2. Therefore, the imaging device 2 is arranged in the space surrounded by the laminated glass 10, the bracket, and the cover, and the imaging device 2 cannot be seen from the vehicle interior side, and only a portion of the imaging device 2 can be seen from the vehicle exterior side through the opening 43 due to the first and second blocking layers 4 and 5. Also, the imaging device 2 and the above-described input/output unit 33 are connected to each other by a cable (not shown), and this cable is drawn out from the cover and is connected to the image processing device 3 arranged at a predetermined position in the vehicle.

4. ANTIFOG SHEET

Figure 8:
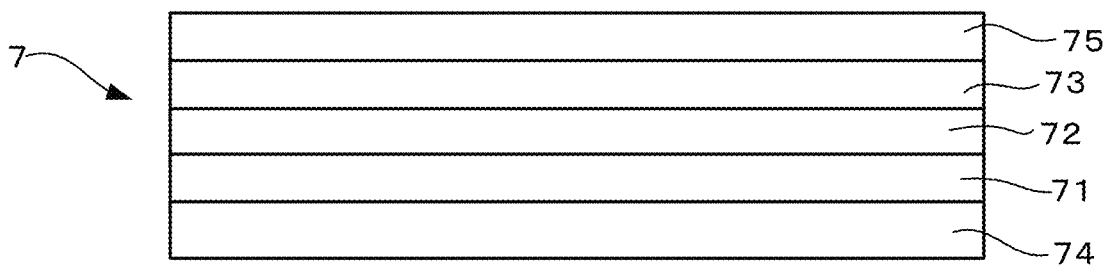
FIG. 8 is a cross-sectional view of an antifog laminate.

Next, the antifog sheet 7 will be described. As described above, the antifog sheet 7 is attached to the opening 43, and as shown in FIG. 8, an adhesive layer 71, a base film 72, and an antifog layer (antifog film) 73 are layered in the stated order until the antifog sheet 7 is fixed to the opening 43. Also, a separable first protective sheet 74 is attached to the adhesive layer 71, a separable second protective sheet 75 is also attached to the antifog layer 73, and an antifog laminate is constituted by these five layers. Hereinafter, each layer will be described.

4-1. Antifog Layer

There is no particular limitation on antifog layers as long as the antifog effect of the laminated glass plate 10 is achieved, and known antifog layers can be used. In general, the types of antifog layer include a hydrophilic type that turns water generated from water vapor into a water layer on its surface, a water absorbent type that absorbs water vapor, a water-repellent and water absorbent type that suppresses the condensation of waterdrops on the surface thereof, and a water repellent type that repels waterdrops generated from water vapor, and any types of antifog layer can be used. The following describes an example of a water-repellent and water absorbent antifog layer as an example thereof.

Organic-Inorganic Composite Antifog Layer

An organic-inorganic composite antifog layer is a single-layer film or a laminated multi-layer film formed on a surface of a base film. The organic-inorganic composite antifog layer contains at least a water absorbent resin, a water repellent group, and a metallic oxide component. The antifog film may further contain other functional components as needed. There is no limitation on the type of water absorbent resin as long as a resin that can absorb and hold water is used. The antifog film can be supplied with a water repellent group using a metallic compound containing a water repellent group (water repellent group-containing metallic compound). The antifog film can be supplied with a metallic oxide component using a metallic compound other than the water repellent group-containing metallic compound, minute particles of a metallic oxide, or the like. Hereinafter, these components will be described.

Water Absorbent Resin

There is no particular limitation on the water absorbent resin, and examples thereof include polyethylene glycol, polyether resin, polyurethane resin, starch-based resin, cellulosic resin, acrylic resin, epoxy resin, polyester polyol, hydroxyalkyl cellulose, polyvinyl alcohol, polyvinyl pyrrolidone, polyvinyl acetal resin, and polyvinyl acetate. In particular, hydroxyalkyl cellulose, polyvinyl alcohol, polyvinyl pyrrolidone, polyvinyl acetal resin, polyvinyl acetate, epoxy resin, and polyurethane resin are preferable, and polyvinyl acetal resin, epoxy resin, and polyurethane resin are more preferable, and polyvinyl acetal resin is particularly preferable.

Polyvinyl acetal resin can be obtained through acetalization of a product obtained through a condensation reaction of polyvinyl alcohol with an aldehyde. The acetalization of polyvinyl alcohol may be carried out using a known method such as a precipitation method in which an aqueous medium is used in the presence of an acid catalyst, or a dissolution method in which a solvent such as alcohol is used. Acetalization can also be carried out in parallel with saponification of polyvinyl acetate. The degree of acetalization is preferably 2 to 40 mol %, more preferably 3 to 30 mol %, particularly preferably 5 to 20 mol %, and preferably 5 to 15 mol % if necessary. The degree of acetalization can be measured based on $^{13}C$ nuclear magnetic resonance spectroscopy, for example. A polyvinyl acetal resin having a degree of acetalization in the above-described range is suitable for forming an organic-inorganic composite antifog layer having favorable water absorbing properties and water resistance.

The average degree of polymerization of polyvinyl alcohol is preferably 200 to 4500, and more preferably 500 to 4500. A high average degree of polymerization is advantageous in the formation of an organic-inorganic composite antifog layer having favorable water absorbing properties and water resistance, but if the average degree of polymerization is excessively high, the viscosity of the solution will be excessively high, and the formation of a film may be negatively affected. The degree of saponification of the polyvinyl alcohol is preferably 75 to 99.8 mol %.

Examples of the aldehyde condensed with polyvinyl alcohol through a condensation reaction include aliphatic aldehydes such as formaldehyde, acetaldehyde, butyraldehyde, hexylcarbaldehyde, octylcarbaldehyde, and decylcarbaldehyde. Examples thereof also include aromatic aldehydes including benzaldehyde; benzaldehyde subjected to substitution using an alkyl group such as 2-methylbenzaldehyde, 3-methylbenzaldehyde, 4-methylbenzaldehyde, or the like; benzaldehyde subjected to substitution using a halogen atom such as chlorobenzaldehyde or the like; substituted benzaldehyde in which a hydrogen atom is substituted with a functional group such as a hydroxy group, an alkoxy group, an amino group, or a cyano group, other than alkyl groups; and a condensed aromatic aldehyde such as naphtaldehyde or anthraldehyde. Aromatic aldehydes, which are highly hydrophobic, are advantageous in the formation of an organic-inorganic composite antifog layer with a low degree of acetalization and excellent water resistance. Use of aromatic aldehydes is also advantageous in that a film having high water absorbing properties is formed while a large number of hydroxy groups are kept. It is preferable that the polyvinyl acetal resin has an acetal structure derived from an aromatic aldehyde, particularly benzaldehyde.

Examples of the epoxy resin include glycidyl ether-based epoxy resin, glycidyl ester-based epoxy resin, glycidyl amine-based epoxy resin, and cyclic aliphatic epoxy resin. In particular, the cyclic aliphatic epoxy resin is preferable.

Examples of the polyurethane resin include polyurethane resins composed of polyisocyanate and polyol. An acrylic polyol and a polyoxyalkylene polyol are preferable as polyols.

The organic-inorganic composite antifog layer contains water absorbent resin as the main component. In the present invention, the "main component" means a component with the highest content on the basis of mass. From the viewpoint of hardness, water absorbing properties, and antifog properties of a film, the content of the water absorbent resin based on the weight of the organic-inorganic composite antifog layer is preferably 50 wt % or more, more preferably 60 wt % or more, and particularly preferably 65 wt % or more, and preferably 95 wt % or less, and more preferably 90 wt % or less.

Water Repellent Group

It is preferable to use a water repellent group, which has high water repellency, in order to sufficiently obtain the above-described effect of the water repellent group. A preferable water repellent group is at least one type selected from (1) chain or cyclic alkyl groups having 3 to 30 carbon atoms and (2) chain or cyclic alkyl groups having 1 to 30 carbon atoms in which at least a portion of hydrogen atoms are substituted with a fluorine atom (also referred to as "fluorine-substituted alkyl groups" hereinafter).

The chain or cyclic alkyl groups in (1) and (2) are preferably chain alkyl groups. The chain alkyl groups may be branched alkyl groups, but are preferably linear alkyl groups. Alkyl groups having more than 30 carbon atoms may lead to an antifog film being opaque. The number of carbon atoms in the alkyl groups is preferably 20 or less, and more preferably 6 to 14 from the viewpoint of balance between the antifog properties, strength, and external appearance of the film. Particularly preferable alkyl groups are linear alkyl groups having 6 to 14 carbon atoms, in particularly, linear alkyl groups having 6 to 12 carbon atoms, such as an n-hexyl group (6 carbon atoms), an n-decyl group (10 carbon atoms), and an n-dodecyl group (12 carbon atoms). The fluorine-substituted alkyl groups in (2) may be groups obtained by substituting only a portion of hydrogen atoms of a chain or a cyclic alkyl group with a fluorine atom, or groups obtained by substituting all of the hydrogen atoms of a chain or a cyclic alkyl group with a fluorine atom, such as linear perfluoroalkyl groups. The fluorine-substituted alkyl groups have high water repellency, and therefore, the effects can be sufficiently obtained by adding a small amount thereof. Note that, when the content of the fluorine-substituted alkyl groups is excessively large, a component containing the fluorine-substituted alkyl groups may be separated from the other components in a coating solution for forming a film.

Hydrolyzable Metallic Compound Containing Water Repellent Group

In order to blend the water repellent groups into the antifog film, it is sufficient that a metallic compound containing a water repellent group (water repellent group-containing metallic compound), particularly a metallic compound (water repellent group-containing hydrolyzable metallic compound) containing a water repellent group and a hydrolyzable functional group or a halogen atom, or a hydrolysate thereof is added to a coating solution for forming a film. In other words, the water repellent group may be derived from the water repellent group-containing hydrolyzable metallic compound. A water repellent group-containing hydrolyzable silicon compound represented by Formula (I) below is favorably used as the water repellent group-containing hydrolyzable silicon compound.

$$R_m SiY_{4-m} \qquad (I)$$

Here, R represents a water repellent group, that is, a chain or cyclic alkyl group having 1 to 30 carbon atoms in which at least a portion of hydrogen atoms is optionally substituted with a fluorine atom, and Y represents a hydrolyzable functional group or a halogen atom, and m represents an integer of 1 to 3. The hydrolyzable functional group is at least one type selected from an alkoxyl group, an acetoxy group, an alkenyloxy group, and an amino group, and preferably an alkoxy group, particularly an alkoxy group having 1 to 4 carbon atoms. An example of the alkenyloxy group is an isopropenoxy group. The halogen atom is preferably a chlorine atom. Note that the functional groups shown here as examples can also be used as "hydrolyzable functional groups" described hereinafter. m is preferably 1 or 2.

When the progress of hydrolysis and polycondensation is completed, the compound represented by Formula (I) supplies a component represented by Formula (II) below.

$$R_m SiO_{(4-m)/2} \tag{II}$$

Here, R and m are as described above. In practice, after the hydrolysis and polycondensation have been performed, the compounds represented by Formula (II) form a network structure in which silicon atoms are linked to one another via oxygen atoms, in the antifog film.

As described above, the compounds represented by Formula (I) are hydrolyzed or partially hydrolyzed, and at least portions thereof are polycondensed. Thus, a network structure including siloxane bonds (Si—O—Si) is formed in which silicon atoms and oxygen atoms are alternately linked and that spreads out three-dimensionally. A water repellent group R is linked to the silicon atom contained in this network structure. In other words, the water repellent group R is immobilized in the network structure including siloxane bonds via an R—Si bond. This structure is advantageous in uniform dispersion of the water repellent groups R in the film. The network structure may contain silica components supplied from silicon compounds (e.g., tetraalkoxysilane and silane coupling agents) other than the water repellent group-containing hydrolyzable silicon compound represented by Formula (I). If a silicon compound that does not contain a water repellent group and contains a hydrolyzable functional group or halogen atom (water repellent group-free hydrolyzable silicon compound) is blended together with the water repellent group-containing hydrolyzable silicon compound in a coating solution for forming an antifog film, a network structure including siloxane bonds containing silicon atoms that are linked to water repellent groups and silicon atoms that are not linked to water repellent groups can be formed. With such a structure, it is easy to independently adjust the content of the water repellent group and the content of the metallic oxide component in the antifog film.

The water repellent groups have the effect of enhancing the antifog performance by enhancing water vapor permeability of the surface of the antifog film containing a water absorbent resin. The two functions, namely the water absorbent function and the water repellent function, are contrary to each other, and therefore, conventionally, a water absorbent material and a water repellent material are distributed in separate layers. However, the maldistribution of water near the surface of the antifog layer is resolved due to the water repellent groups, so that the time it takes for dew to condense is prolonged, and the antifog properties of the antifog film having a single-layer structure are thus enhanced. The following is a description of the effects.

Water vapor that has infiltrated the antifog film containing the water absorbent resin forms hydrogen bonds with the hydroxy groups in the water absorbent resin and the like, and is retained in the form of bound water. As the amount of water vapor increases, the form of water vapor changes from bound water to semibound water, and finally, water vapor is retained in the form of free water retained in voids in the antifog film. The water repellent groups prevent the formation of hydrogen bonds and facilitate the dissociation of formed hydrogen bonds in the antifog film. If the content of the water absorbent resin is the same, the number of hydroxy groups capable of forming a hydrogen bond in the film is the same, but the speed of hydrogen bond formation is reduced due to the water repellent groups. Therefore, if the antifog film containing the water repellent groups is used, moisture will ultimately be retained in any of the above-mentioned forms in the antifog film, but water vapor can diffuse to the bottom portion of the film as it is until it is retained therein. Furthermore, water that is once retained dissociates relatively easily and is likely to move to the bottom portion of the film in the form of water vapor. As a result, the distribution of the retained amount of moisture in the thickness direction of the film is relatively uniform between the vicinity of the surface and the bottom portion of the film. That is, the entirety in the thickness direction of the antifog film can be effectively used to absorb water supplied to the surface of the film, and therefore, waterdrops are less likely to be formed on the surface thereof through condensation, thus resulting in the enhancement of antifog properties. Also, the anti fog film that has absorbed moisture due to waterdrops being less likely to form on the surface thereof through condensation is less likely to freeze even in low temperatures. Therefore, when the antifog film is fixed to the opening 43, it is possible to secure the field of view of the opening 43 in a wide temperature range.

On the other hand, with an antifog film that does not contain the water repellent groups, water vapor that has infiltrated the film is retained significantly easily in the form of bound water, semibound water, or free water. Therefore, water vapor that has infiltrated the antifog film tends to be retained in the vicinity of the surface of the film. As a result, in the film, the amount of moisture is extremely large in the vicinity of the surface, and rapidly decreases toward the bottom portion of the film. That is, although the bottom portion of the film can further absorb water, the vicinity of the surface of the film is saturated with moisture and the moisture condenses into waterdrops, and therefore, the anti fog properties are limited.

When the water repellent groups are introduced into the antifog film using the water repellent group-containing hydrolyzable silicon compound (see Formula (I)), a network structure including stable siloxane bonds (Si—O—Si) is formed. The formation of this network structure is advantageous from the viewpoint that not only abrasion resistance but also hardness, water resistance, and the like are enhanced.

It is sufficient that the water repellent groups are added in an amount with which the contact angle of water on the surface of the antifog film is 70 degrees or more, preferably 80 degrees or more, and more preferably 90 degrees or more. A measurement value obtained from a 4 mg waterdrop dropped onto the surface of the film is taken as the contact angle of water. In particular, when a methyl group or ethyl group, which has slightly low water repellency, is used as the water repellent group, it is preferable to blend, into the antifog film, the repellent groups in an amount with which the contact angle of water is within the above-mentioned range. The upper limit of the contact angle of this waterdrop is not particularly limited, but is 150 degrees or less, 120 degrees or less, or 100 degrees or less, for example. It is preferable that the water repellent groups are uniformly contained in the antifog film such that the contact angles of waterdrops are within the above-mentioned range over the entire region of the surface of the antifog film.

It is preferable that the antifog film contains the water repellent groups such that the amount of water repellent groups is within a range of 0.05 parts by mass or more, preferably within a range of 0.1 parts by mass or more, and more preferably within a range of 0.3 parts by mass or more, and within a range of 10 parts by mass or less and preferably within a range of 5 parts by mass or less, with respect to 100 parts by mass of the water absorbent resin.

Inorganic Oxide

The inorganic oxide is an oxide of at least one type of element selected from Si, Ti, Zr, Ta, Nb, Nd, La, Ce, and Sn, for example, and preferably includes an oxide of Si (silica). It is preferable that the organic-inorganic composite antifog layer contains the inorganic oxide such that the amount of the inorganic oxide is preferably 0.01 parts by weight or more, more preferably 0.1 parts by weight or more, further preferably 0.2 parts by weight or more, particularly preferably 1 part by weight or more, most preferably 5 parts by weight or more, and 10 parts by weight or more, and 20 parts by weight or more if necessary, and preferably 50 parts by weight or less, more preferably 45 parts by weight or less, further preferably 40 parts by weight or less, particularly preferably 35 parts by weight or less, most preferably 33 parts by weight or less, and 30 parts by weight or less if necessary, with respect to 100 parts by weight of the water absorbent resin. The inorganic oxide is a necessary component for ensuring the strength of the organic-inorganic composite antifog layer, particularly abrasion resistance, but if the content of the inorganic oxide is excessively large, the antifog properties of the organic-inorganic composite antifog layer are impaired.

Minute Particles of Inorganic Oxide

The organic-inorganic composite antifog layer may further contain minute particles of an inorganic oxide as at least a portion of the inorganic oxide. An inorganic oxide constituting the minute particles of the inorganic oxide is an oxide of at least one type of element selected from. Si, Ti, Zr, Ta, Nb, Nd, La, Ce, and Sn, for example, and minute particles of silica are preferable. The minute particles of silica can be introduced into the organic-inorganic composite antifog layer by adding colloidal silica thereto, for example. The minute particles of an inorganic oxide excel at transmitting stress applied to the organic-inorganic composite antifog layer to an article that supports the organic-inorganic composite antifog layer, and have high hardness. Therefore, the addition of the minute particles of an inorganic oxide is advantageous from the viewpoint that the abrasion resistance of the organic-inorganic composite antifog layer is enhanced. Also, when the minute particles of an inorganic oxide are added to the organic-inorganic composite antifog layer, minute voids are formed in portions where the minute particles are in contact with one another or close to one another, and water vapor is likely to be introduced into the film through these voids. Accordingly, the addition of minute particles of an inorganic oxide may advantageously act to enhance the antifog properties. Minute particles of an inorganic oxide that have been formed in advance are added to a coating solution for forming an organic-inorganic composite antifog layer, and the minute particles of an inorganic oxide can thus be supplied to the organic-inorganic composite antifog layer.

When the average particle diameter of the minute particles of an inorganic oxide is excessively large, the organic-inorganic composite antifog layer may be opaque, whereas when the average particle diameter of the minute particles of an inorganic oxide is excessively small, the minute particles aggregate, thus making it difficult to uniformly disperse the minute particles. From this viewpoint, the average particle diameter of the minute particles of an inorganic oxide is preferably 1 to 20 nm, and more preferably 5 to 20 nm. Note that the average particle diameter of the minute particles of an inorganic oxide in the form of primary particles is taken as the average particle diameter of the minute particles of an inorganic oxide described herein. The average particle diameter of the minute particles of an inorganic oxide is determined by measuring, through observation using a scanning electron microscope, the particle diameters of fifty randomly selected minute particles and employing the average value thereof. If the content of the minute particles of an inorganic oxide is excessively large, there is a risk that the amount of water absorption will decrease in the entire organic-inorganic composite antifog layer, and thus the organic-inorganic composite antifog layer will become opaque. It is preferable to add the minute particles of an inorganic oxide such that the amount thereof is preferably 0 to 50 parts by weight, more preferably 2 to 30 parts by weight, further preferably 5 to 25 parts by weight, and particularly preferably 10 to 20 parts by weight with respect to 100 parts by weight of the water absorbent resin.

Hydrolyzable Metallic Compound Containing No Water Repellent Groups

The antifog film may contain a metallic oxide component derived from a hydrolyzable metallic compound that does not contain a water repellent group (water repellent group-free hydrolyzable compound). A preferable water repellent group-free hydrolyzable metallic compound is a hydrolyzable silicon compound that does not contain a water repellent group. The hydrolyzable silicon compound that does not contain a water repellent group is at least one type of silicon compound (note that a water repellent group is not contained) selected from silicon alkoxide, chlorosilane, acetoxysilane, alkenyloxysilane, and aminosilne, and silicon alkoxide that does not contain a water repellent group is preferable. Note that an example of the alkenyloxysilane is isopropenoxysilane.

The hydrolyzable silicon compound that does not contain a water repellent group may be a compound represented by Formula (III) below.

$$SiY_4 \quad (III)$$

As described above, Y represents a hydrolyzable functional group, and is preferably at least one selected from an alkoxyl group, an acetoxy group, an alkenyloxy group, an amino group, and a halogen atom.

The water repellent group-free hydrolyzable metallic compounds are hydrolyzed or partially hydrolyzed, and at least portions thereof are polycondensed. Thus, a metallic oxide component in which metallic atoms and oxygen atoms are linked is supplied. This component firmly joins minute particles of a metallic oxide and the water absorbent resin to each other, and may contribute to an increase in the abrasion resistance, hardness, water resistance, and the like of the antifog film. It is preferable to set the amount of metallic oxide component derived from the hydrolyzable metallic compound that does not contain a water repellent group to be within a range of 0 to 40 parts by mass, preferably 0.1 to 30 parts by mass, more preferably 1 to 20 parts by mass, particularly preferably 3 to 10 parts by mass, and 4 to 12 parts by mass if necessary, with respect to 100 parts by mass of the water absorbent resin.

A preferable example of the hydrolyzable silicon compound that does not contain a water repellent group is tetraalkoxysilane, and more specifically, tetraalkoxysilane containing an alkoxy group having 1 to 4 carbon atoms. The tetraalkoxysilane is at least one selected from tetramethoxysilane, tetraethoxysilane, tetra-n-propoxysilane, tetraisopropoxysilane, tetra-n-butoxysilane, tetraisobutoxysilane, tetra-sec-butoxysilane, and tetra-tert-butoxysilane, for example.

If the content of the metallic oxide (silica) component derived from tetraalkoxysilane is excessively large, the antifog properties of the antifog film may be impaired. One reason for this is that the flexibility of the antifog film is impaired, and thus the swelling and shrinkage of the film caused by the absorption and discharge of moisture are limited. It is preferable to add the metallic oxide component derived from tetraalkoxysilane such that the amount thereof is within a range of 0 to 30 parts by mass, preferably 1 to 20 parts by mass, and more preferably 3 to 10 parts by mass, with respect to 100 parts by mass of the water absorbent resin.

Another preferable example of the hydrolyzable silicon compound that does not contain a water repellent group is a silane coupling agent. The silane coupling agent is a silicon compound containing active functional groups that are different from each other. It is preferable that a portion of the active functional groups are hydrolyzable functional groups. An example of the silane coupling agent is a silicon compound containing an epoxy group and/or an amino group and a hydrolyzable functional group. Preferable examples of the silane coupling agent include glycidyloxyalkyltrialkoxysilane and aminoalkyltrialkoxysilane. It is preferable that, in these silane coupling agents, an alkylene group that is directly linked to a silicon atom has 1 to 3 carbon atoms. Because a glycidyloxyalkyl group and an aminoalkyl group contain a hydrophilic functional group (epoxy group, amino group), they are not water-repellent as a whole even though they contain an alkylene group.

The silane coupling agent firmly couples water absorbent resin, which is an organic component, and the minute particles of a metallic oxide and the like, which are inorganic components, and may contribute to the enhancement of the abrasion resistance, hardness, water resistance, and the like of the antifog film. However, when the content of the metallic oxide (silica) component derived from the silane coupling agent is excessively large, the antifog properties of the antifog film are impaired, and the antifog film may be opaque in some cases. It is preferable to add the metallic oxide component derived from the silane coupling agent such that the amount thereof is within a range of 0 to 10 parts by mass, preferably 0.05 to 5 parts by mass, and more preferably 0.1 to 2 parts by mass, with respect to 100 parts by mass of the water absorbent resin.

Cross-Linked Structure

The antifog film may also include a cross-linked structure formed using a cross-linking agent, preferably at least one type of cross-linking agent selected from an organic boron compound, an organic titanium compound, and an organic zirconium compound. The introduction of the cross-linked structure enhances the abrasion resistance, scratch resistance, and water resistance of the antifog film. From another viewpoint, the introduction of the cross-linked structure facilitates an improvement in the durability of the antifog film without impairing the antifog properties of the antifog film.

When the cross-linked structure formed using a cross-linking agent is introduced into the antifog film in which the metallic oxide component is a silica component, the antifog film may contain a metallic atom other than silicon, preferably boron, titanium, or zirconium, in addition to silicon, as metallic atoms.

There is no particular limitation on the type of cross-linking agent as long as the used water absorbent resin can be cross-linked. Here, only examples of the organic titanium compound will be listed. The organic titanium compound is at least one selected from a titanium alkoxide, a titanium chelate-based compound, and titanium acylate, for example. Examples of the titanium alkoxide include titanium tetraisopropoxide, titanium tetra-n-butoxide, and titanium tetraoctoxide. Examples of the titanium chelate compound include titanium acetylacetonate, titanium ethyl acetoacetate, titanium octyleneglycol, titanium triethanolamine, and titanium lactate. The titanium lactate may be an ammonium salt thereof (titanium lactate ammonium). An example of the titanium acylate is titanium stearate. A preferable organic titanium compound is a titanium chelate compound, particularly titanium lactate.

When the water absorbent resin is polyvinyl acetal, a preferable cross-linking agent is an organic titanium compound, particularly titanium lactate.

Other Optional Components

Other additives may also be blended into the antifog film. Examples of the additives include glycols such as glycerin and ethylene glycol that have the function of improving the antifog properties. A surfactant, a leveling agent, an ultraviolet absorbing agent, a coloring agent, an antifoaming agent, an antiseptic agent, and the like may be used as an additive.

Film Thickness

It is sufficient that the film thicknesses of the organic-inorganic composite antifog layer is adjusted as appropriate according to required antifog properties and the like. The film thickness of the organic-inorganic composite antifog layer is preferably 2 to 20 μm, more preferably 2 to 15 μm, and further preferably 3 to 10 μm.

Note that the above-described antifog layer is an example, and it is possible to use other known antifog layers, and to use various antifog layers such as the antifog layer described in JP 2001-146585A, for example.

4-2. Base Film

The base film 72 is formed by a transparent resin film, and can be formed of polyethylene terephthalate, polyvinyl chloride, polyvinylidene chloride, polycarbonate, or acrylic resin, for example. Also, the resin may contain an ultraviolet absorbing agent.

Examples of the ultraviolet absorbing agent include organic substances such as benzotriazole compounds (e.g., 2-(2'-hydroxy-5'-methylphenyl)benzotriazole, and 2-(2'-hydroxy-3',5'-di-t-butylphenyl)benzotriazole), benzophenone compounds (e.g., 2,2',4,4'-tetrahydroxybenzophenone, 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone)), hydroxyphenyltriazine compounds (e.g., 2-(2-hydroxy-4-octoxyphenyl)-4,6-bis(2,4-di-t-buthylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-t-but ylphenyl)-s-triazine), and cyanoacrylate compounds (e.g., ethyl-α-cyano-β,β-diphenyl acrylate, methyl-2-cyano-3-methyl-3-(p-methoxyphenyl) acrylate). The ultraviolet absorbing agents may be used alone or in combination of two or more types. Also, the ultraviolet absorbing agent may be at least one type of organic pigment selected from polymethine compounds, imidazoline compounds, coumarin compounds, naphthalimide compounds, perylene compounds, azo compounds, isoindolinone compounds, quinophthalone compounds, and quinoline compounds.

Such a base film 72 preferably has a transmittance of 5% or less at a wavelength of 380 nm, and has a transmittance of 50% or less at a wavelength of 400 nm, for example.

Also, the base film 72 needs to have a certain degree of rigidity because the base film 72 supports the antifog layer 73. However, if the thickness thereof is excessively large, Haze ratio is likely to be high. Thus, the base film 72 preferably has a thickness of 30 to 200 μm, for example.

4-3. Adhesive Layer

As will be described later, the adhesive layer 71 needs only to be capable of fixing the base film 72 to the inner glass plate 12 with sufficient strength. Specifically, it is possible to use an adhesive layer composed of acrylic resin, rubber, or resin that has tackiness, the resin being obtained through copolymerization of a methacrylic monomer and an acrylic monomer, and being set to a desired glass transition temperature, and the like. It is possible to use methyl acrylate, ethyl acrylate, butyl acrylate, stearyl acrylate, diethylhexyl acrylate, and the like as the acrylic monomer, and to use ethyl methacrylate, butyl methacrylate, isobutyl methacrylate, stearyl methacrylate, and the like as the methacrylic monomer. Also, if the adhesive layer is applied through heat lamination or the like, an organic substance that softens at the lamination temperature may be used. When a resin obtained through copolymerization of a methacrylic monomer and an acrylic monomer is used, the glass transition temperature can be adjusted by changing the ratio of blended monomers. The adhesive layer may contain an ultraviolet absorbing agent.

4-4. Protective Sheet

A first protective sheet 74 is for protecting the adhesive layer 71 until the first protective sheet 74 is fixed to the opening 43 of the laminated glass 10, and the first protective sheet 74 is constituted by a resin sheet to which a release agent such as silicone or the like is applied, for example. Similarly, a second protective sheet 75 is for protecting the antifog layer 73 until the second protective sheet 75 is fixed to the opening 43 of the laminated glass, and the second protective sheet 75 is constituted by a resin sheet to which a release agent is applied. A known general release sheet can be adopted in either case.

5. METHOD FOR MANUFACTURING WINDSHIELD

Next, a method for manufacturing a windshield will be described. First, the first blocking layer 4 and the second blocking layer 5 are respectively layered on the inner glass plate 12 and the outer glass plate 11 formed into predetermined shapes. Then, these glass plates 11 and 12 are shaped to be curved. Although there is no particular limitation on the method therefor, known press-molding can be used, for example. Alternatively, once the outer glass plate 11 and the inner glass plate 12 have been placed on each other on a mold, the mold is heated by passing the mold through a heating furnace. Accordingly, the glass plates 11 and 12 can be curved under their own weight.

After the outer glass plate 11 and the inner glass plate 12 are molded in this manner, a laminate is formed in which the interlayer 13 is sandwiched between the outer glass plate 11 and the inner glass plate 12. Note that the interlayer 13 is larger than the glass plates 11 and 12.

Then, the laminate is placed into a rubber bag, and preliminarily bonding is carried out at about 70° C. to 110° C. under vacuum suction. Preliminary bonding can be carried out using a method other than this method, and the following method can also be adopted. The above-described laminate is heated in an oven at 45° C. to 65° C., for example. Subsequently, this laminate is pressed by a roll at 0.45 to 0.55 MPa. Then, the laminate is heated in an oven again at 80° C. to 105° C., and is then pressed again by a roll at 0.45 to 0.55 MPa. Preliminary bonding is completed in this manner.

Then, permanent bonding is performed. The preliminarily bonded laminate is permanently bonded using an autoclave at a pressure of 8 to 15 atm and at 100° C. to 150° C., for example. Specifically, permanent bonding can be performed under the conditions of 14 atm of pressure and a temperature of 135° C., for example. The interlayer 13 is bonded to the glass plates 11 and 12 through preliminary bonding and permanent bonding described above. Then, the interlayer 13 that protrudes from the outer glass plate 11 and the inner glass plate 12 is cut off.

Then, the antifog sheet 7 is attached so as to cover the opening 43. Specifically, first, the antifog laminate is prepared, and the first protective sheet 74 attached to the adhesive layer 71 is removed therefrom. Then, the exposed adhesive layer 71 is attached to the opening 43. Thereafter, the second protective sheet 75 is pressed to firmly fix the antifog sheet 7 to the opening 43. Subsequently, the second protective sheet 75 is removed to expose the antifog layer 73, and thus attachment of the antifog sheet 7 is completed. Subsequently, the bracket 6 is attached onto the first blocking layer 4. Thereafter, the imaging device 2 is attached to the bracket 6.

Note that there is no particular limitation on the timing when the second protective sheet 75 is removed. The second protective sheet 75 may be removed after the bracket 6 is attached, or immediately before the imaging device 2 is attached to the bracket 6, for example. Also, the bracket 6 may be attached before the antifog sheet is attached.

6. FEATURES

According to the above-described windshield, it is possible to obtain the following effects.

(1) As a result of the antifog sheet 7 being attached to the opening 43, it is possible to prevent the opening 43 from fogging up. Thus, when light is received by the imaging device 2 via the opening 43, it is possible to prevent flaws such as hindrance to the passage of light due to the opening 43 being fogged up and inability to make accurate measurements.

In particular, the upper portion of the first blocking layer 4 located inside the vehicle and provided with the opening 43 is likely to be cool and fog up even if a heating device is ON. Therefore, it is advantageous that the antifog layer is laminated at such a position. Also, the opening 43 on which the antifog layer is laminated is covered by the bracket 6 and the cover, and thus, there is an issue that warm air from a heating device or a defroster is unlikely to reach the opening 43. Also, there is an issue that air in the space covered by the bracket 6 and the cover cannot be easily exchanged with air outside of this space, and thus, when the humidity of the air in the space reaches saturation, waterdrops are likely to adhere to the surface of the glass plates. Thus, it is very important to provide an antifog sheet 7 in the space covered in the above-described manner.

(2) Also, the antifog sheet 7 is formed so as to cover not only the opening 43 but also the upper side of the opening 43. It is possible to improve water absorption performance by making the antifog sheet 7 as large as possible in this manner. That is, as a result of water absorption performance being improved, the humidity inside the bracket 6 can be reduced, as a result of which it is possible to prevent dew condensation on the inner glass plate 12 in the bracket 6.

(3) As a result of the second blocking layer 5 blocking the upper portion of the opening 43 in the first blocking layer 4, a window for imaging performed by a camera of the imaging device 2 (a path of light) is formed by the lower edge of the extension portion 52 of the second blocking layer 5 and the opening 43 in the first blocking layer 4. Therefore, by providing the second blocking layer 5, it is possible to prevent a portion of the imaging device 2 from being seen from the outside of the vehicle via the opening 43. Also, the angle of view used when images of the outside of the vehicle are taken by the camera can be adjusted by the second blocking layer 5. Furthermore, it is possible to prevent extra light from entering the field of view of the camera from the outside of the vehicle. In this manner, in this embodiment, the bracket 6 and the imaging device 2 are prevented by the first blocking layer 4 from being seen from the outside of the vehicle, and the imaging device 2 appropriately operates due to the second blocking layer 5. Therefore, by providing two separate blocking layers, the degree of freedom in design for the above-described requirements is increased, and it is possible to provide blocking layers that sufficiently satisfy the above requirements.

(4) It is known that, because there is a difference in the linear expansion coefficient (the coefficient of thermal expansion) between a glass plate and a blocking layer made of a ceramic material, warping occurs in the vicinity of the edge portion of the blocking layer in the glass plate. Therefore, there is an issue that, if the upper edge of the opening 43 in the first blocking layer 4 coincides with the lower edge of the extension portion 52 of the second blocking layer 5, for example, a region of the outer glass plate 11 where warping occurs and a region of the inner glass plate 12 where warping occurs overlap with each other, and thus the amount of warping in the laminated glass 10 overall increases. In view of this, in this embodiment, as described above, the lower edge of the extension portion 52 of the second blocking layer 5 is arranged below the upper edge of the opening 43 in the first blocking layer 4, thus suppressing overlapping of the regions where warping occurs. Accordingly, it is possible to suppress acquisition of images warped through imaging performed by the camera.

When warping was examined by the inventor of the present invention, the following results were obtained. First, with Sample 1, the lower edge of the extension portion 52 of the second blocking layer 5 was arranged 13.5 mm below the upper edge of the opening 43 in the first blocking layer 4. On the other hand, with Sample 2, the upper edge of the opening 43 in the first blocking layer 4 was made to coincide with the lower edge of the extension portion 52 of the second blocking layer 5. Then, with regard to Samples 1 and 2, when the lens power in a direction from the upper edge of the opening 43 toward the inner side of the opening 43 was actually measured, the graph shown in FIG. 9 was obtained. In this graph, the horizontal axis indicates the distance from the upper edge of the opening, and the vertical axis indicates the absolute value (mili diopter) of the lens power. A "diopter" indicates the reciprocal of the focal length as per the effect of a lens, and is measured in units of 1/m. The lens power indicates the amount of warping occurring in the glass plate.

The method of measuring the lens power is as described below. First, light is projected at the glass plate in a darkroom, and a shadow is formed on a screen behind the glass plate. At this time, if there is a convex lens effect on the glass plate, the light is condensed, and the shadow on the screen is bright. On the other hand, if there is a concave lens effect on the glass plate, the shadow is dark. Here, there is a correlation between the lens power and the brightness of the shadow on the screen, and the relationship between the lens power and the brightness can be determined by placing a lens whose lens power is already known and then measuring the brightness on the screen. Accordingly, when the target glass plate (or laminated glass) is arranged, and the brightness on the screen is measured over the entire glass plate, the lens power of the glass plate can be obtained.

Figure 9:
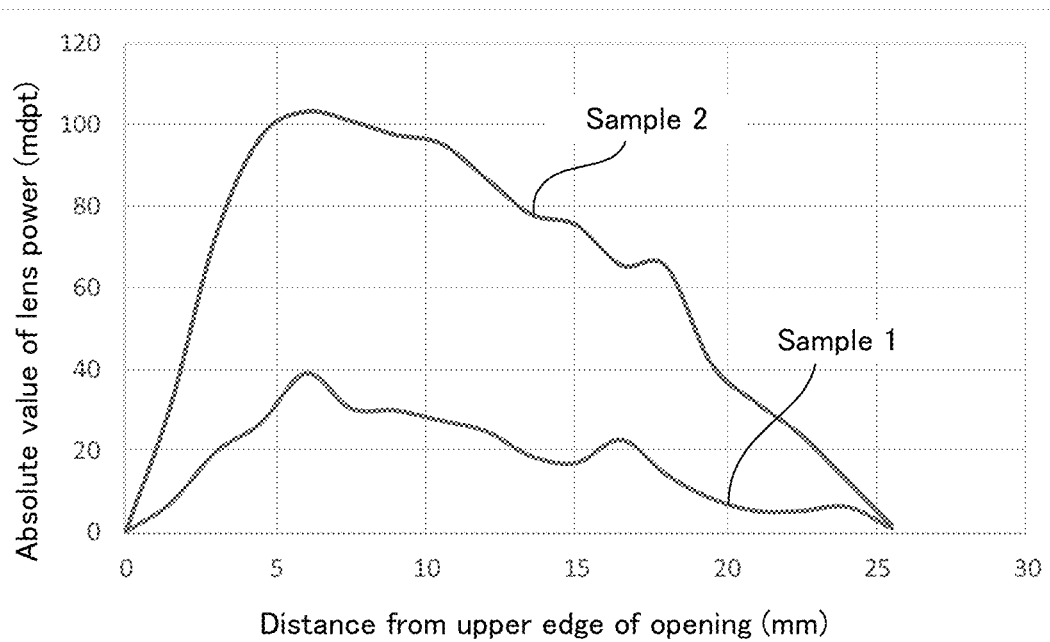
FIG. 9 is a graph showing the amount of warping occurring in a laminated glass.

As shown in FIG. 9, it was found that, with Sample 2 in which a region of the outer glass plate where warping occurred and a region of the inner glass plate where warping occurred substantially overlapped with each other, the calculated amount of warping was significantly larger than that of Sample 1. Therefore, it is possible to suppress warping occurring in the entire laminated glass 10 by arranging the lower edge of the extension portion 52 of the second blocking layer 5 below the upper edge of the opening 43 in the first blocking layer 4.

Note that, based on the above-described results, as long as the upper edge of the opening 43 in the first blocking layer 4 and the lower edge of the extension portion 52 of the second blocking layer 5 are displaced from each other, the distance therebetween is not particularly limited. However, the above-described distance is preferably 4 mm or more, and further preferably 6 mm or more because warping occurs in the vicinity of an edge portion of a blocking layer within at least 4 mm from the edge portion.

(5) If the antifog sheet 7 is made large as described above, the antifog sheet 7 extends past the boundary between the opening 43 and the first blocking layer 4, and is fixed to the first blocking layer 4 as in this embodiment. At this time, there is a risk that the antifog sheet 7 will be on a step formed at the upper edge of the opening 43 (the step between the inner glass plate 12 and the first blocking layer 4), and air bubbles may be generated when the antifog sheet 7 is attached. In view of this, in this embodiment, the second blocking layer 5 is provided on the surface on the vehicle interior side of the outer glass plate 11, and the second blocking layer 5 is arranged covering a position corresponding to the portion where the antifog sheet 7 and the first blocking layer 4 overlap with each other. Therefore, even if air bubbles are generated in the vicinity of the above-described step, it is possible to conceal the air bubbles with the second blocking layer 5, and to prevent air bubbles from being seen from the outside of the vehicle. Also, although it is possible to perform operations for removing air bubbles using a scraper or the like when attaching the antifog sheet 7, there is an issue that the number of operation processes is increased due to these operations. Therefore, by providing the second blocking layer 5 as described above, it is possible to prevent additional operations from being generated.

(6) Note that it is also conceivable that the first blocking layer 4 is not provided, and a blocking layer having the same shape as the first blocking layer 4 is layered on a surface on the vehicle interior side of the outer glass plate 11. Accordingly, the antifog sheet is not on the blocking layer, and thus no air bubbles are generated. However, if the blocking layer having the same shape as the first blocking layer 4 is layered on the surface on the vehicle interior side of the outer glass plate 11, there is a risk that the blocking layer at the peripheral edge of the opening may enter the field of view of the camera because the imaging device 2 is present on the vehicle interior side. To address this, it is conceivable to make the opening in this blocking layer larger. However, in this case, the area of the blocking layer decreases, and thus there is a risk that a bracket, an adhesive for adhering the bracket, or the like may be seen from the outside of the vehicle. Therefore, the first and second blocking layers 4 and 5 are provided in order to prevent such issues in this embodiment.

7. MODIFIED EXAMPLES

Although the embodiment of the present invention has been described above, the present invention is not limited to the above-described embodiment, and various modifications can be carried out without departing from the gist of the invention. Note that the following modified examples can be combined as appropriate.

7-1

Figure 10:
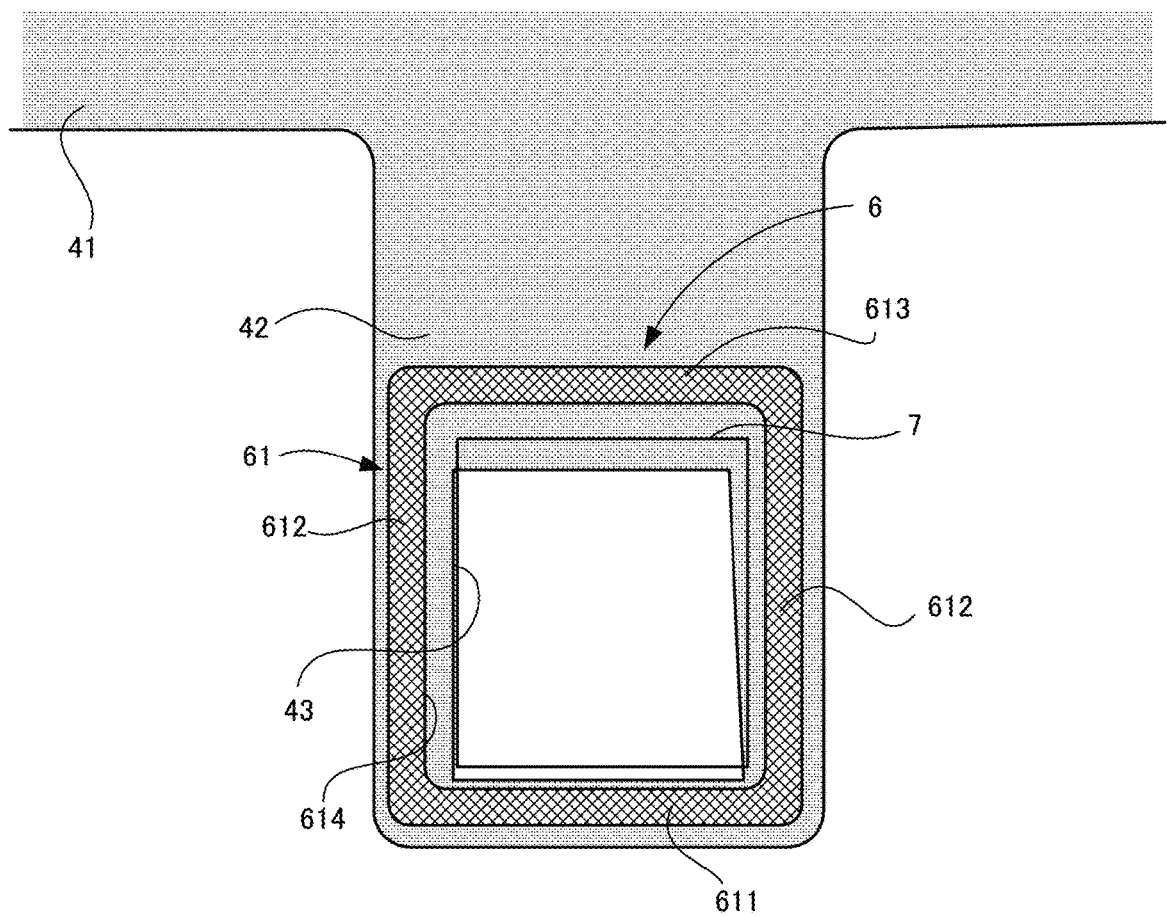
FIG. 10 is a plan view showing another example of FIG. 5.
Figure 11:
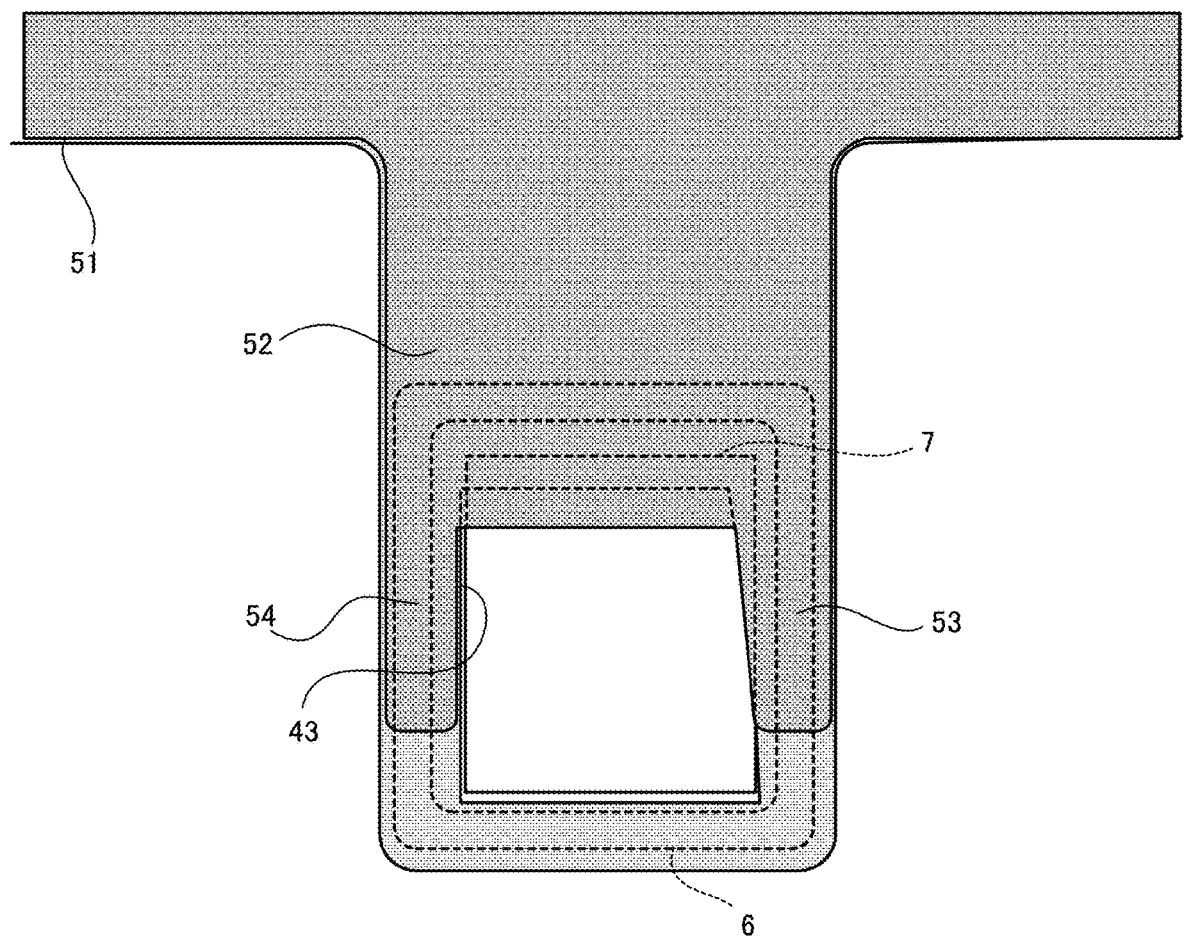
FIG. 11 is a plan view showing another example of FIG. 6.

Although a configuration is adopted in which the upper portion of the antifog sheet 7 extends past the upper edge of the opening 43 and overlaps with the first blocking layer 4 in the above-described embodiment, the antifog sheet 7 and the first blocking layer 4 may overlap with each other in another portion of the peripheral edge of the opening 43. As shown in FIG. 10, for example, a configuration may be adopted in which the right side of the opening 43 is inclined, and the antifog sheet 7 protrudes from the right side of the opening 43, and overlaps with the first blocking layer 4. In this case, as shown in FIG. 11, the lower end of the second blocking layer 5 is provided with a pair of protrusions 53 and 54 that extend along the first blocking layer 4 on the two sides of the opening 43, and the portion where the antifog sheet 7 and the right side of the opening 43 overlap with each other is covered by the protrusion 53. Although only the right side of the opening 43 overlaps with the antifog sheet 7 in this example, a configuration may be adopted in which the left side also overlaps with the antifog sheet 7 and the overlapping portion is covered by the left protrusion 54.

The antifog sheet 7 and the peripheral edge of the opening 43 may overlap with each other at any position in this manner, and the second blocking layer 5 need only be arranged to cover the overlapping portion. The second blocking layer 5 need only be arranged to extend toward the first blocking layer 4 at least along the boundary of the opening 43, and in order to conceal air bubbles, the second blocking layer 5 preferably protrudes inward of the opening 43 from the boundary by preferably 1 mm, and more preferably 2 mm or more. However, if the second blocking layer 5 excessively enters the opening 43, the opening 43 is narrowed and the second blocking layer 5 may enter the field of view of the camera. Therefore, although the entry distance depends on the size of the opening 43 and is not particularly limited, the entry distance is preferably within 15 mm, more preferably within 10 mm, and particularly preferably within 5 mm.

7-2

Figure 12:
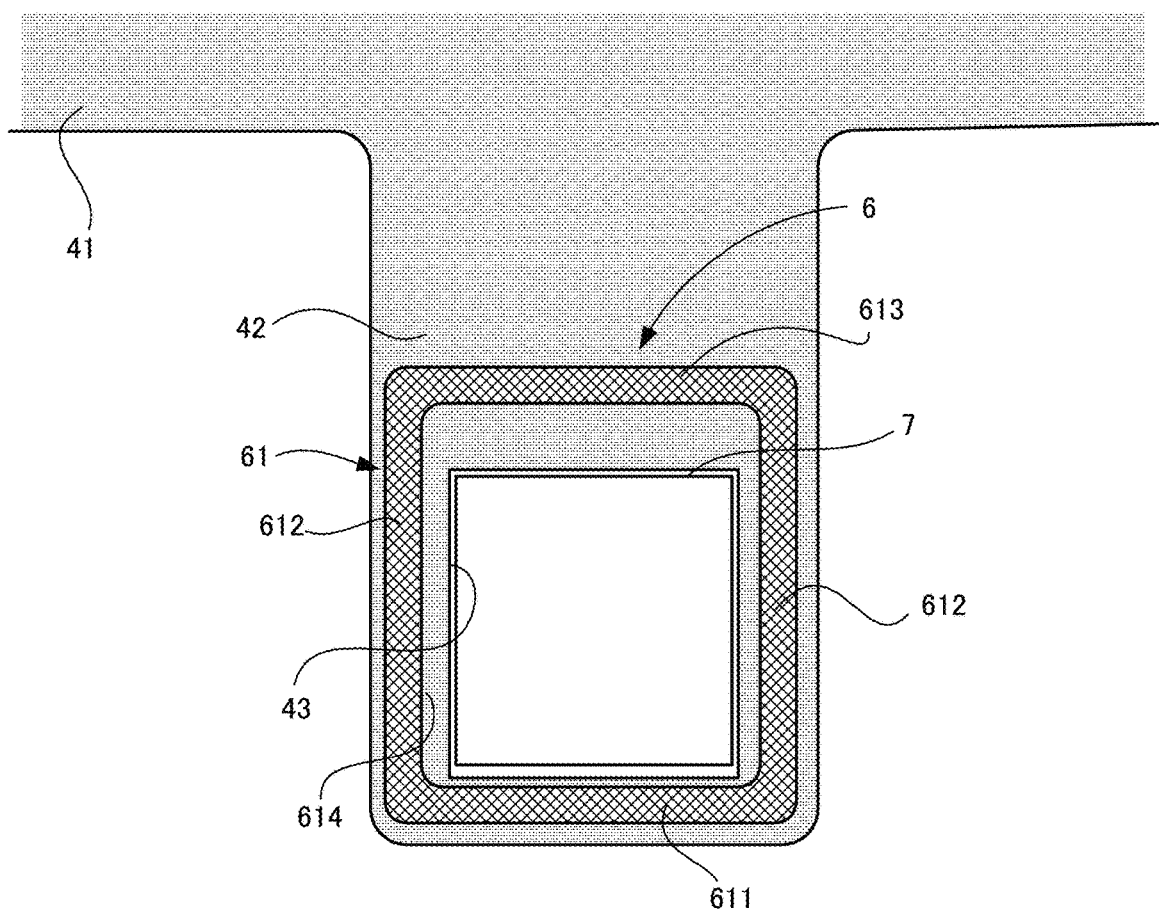
FIG. 12 is a plan view showing another example of FIG. 5.
Figure 13:
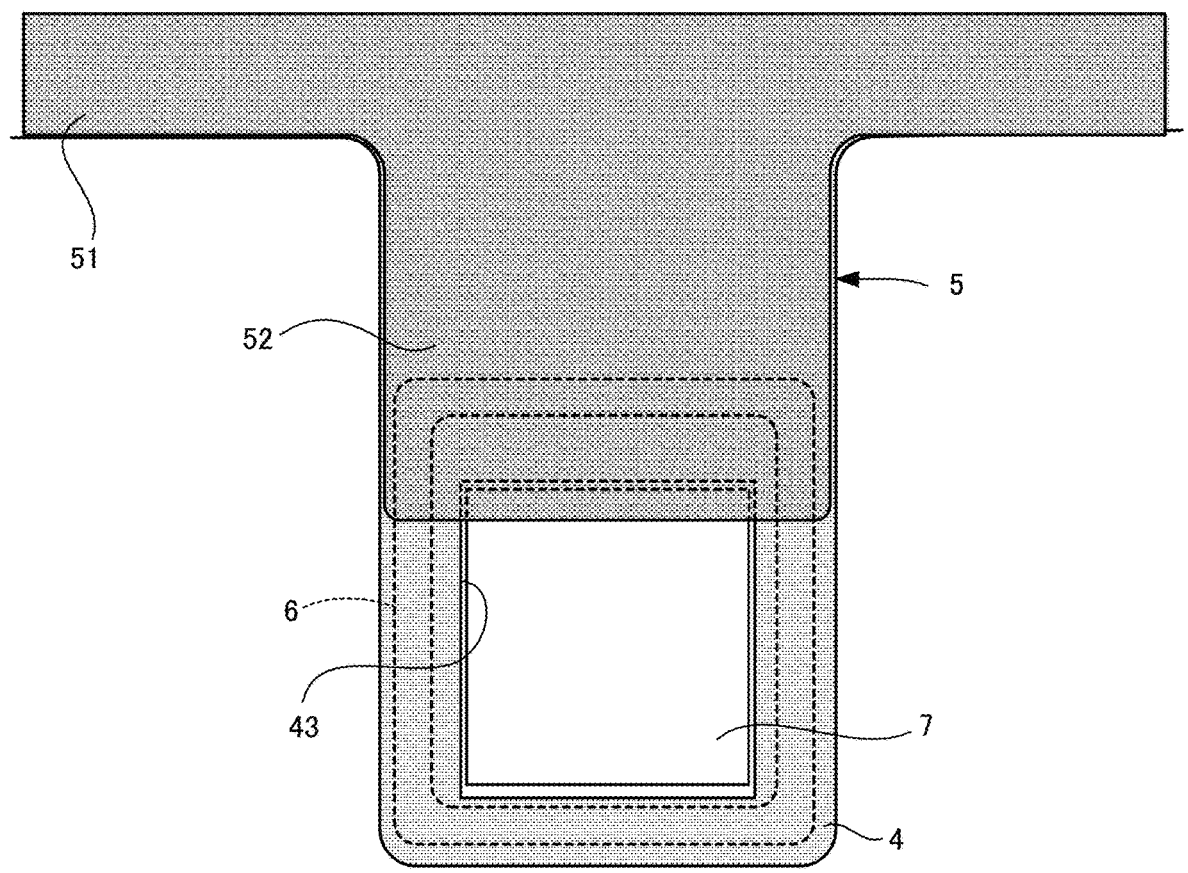
FIG. 13 is a plan view showing another example of FIG. 6.

Although the antifog sheet 7 is attached so as to overlap with the peripheral edge of the opening 43 in the first blocking layer 4 in the description above, as shown in FIGS. 12 and 13, for example, the antifog sheet 7 may be attached to the inside of the opening 43 such that the peripheral edge of the opening 43 and the antifog sheet 7 do not overlap with each other. Accordingly, it is possible to prevent the above-described generation of air bubbles. In this case, the size of the opening needs to be increased or the size of the antifog sheet 7 needs to be reduced in order to prevent the peripheral edge of the opening 43 and the antifog sheet 7 from overlapping with each other. However, it is preferable to make the opening 43 larger because water absorption performance decreases when the antifog sheet 7 is made smaller. Even if the opening 43 is made larger in this manner, the size of the imaging window that is seen from the outside of the vehicle can be adjusted by the second blocking layer 5, which is advantageous in that it is possible to prevent the imaging device 2 and the bracket 6 from being seen from the outside of the vehicle.

7-3

A portion or all of the blocking layers 4 and 5 may be composed of a blocking film that is attachable to the laminated glass 10, and the field of view from the outside of the vehicle may be blocked by the blocking film.

7-4

In the above-described embodiment, the imaging device 2 that has a camera is used as the information acquisition device of the present invention, but there is no limitation to this, and various information acquisition devices can be used. That is, there is no limitation as long as the information acquisition device emits and/or receives light in order to acquire information from the outside of the vehicle. Various devices can be used such as a light receiving device for receiving signals from the outside of the vehicle that are emitted by a laser radar, a light sensor, a rain sensor, an optical beacon, or the like. Alternatively, these may be combined. Also, an opening such as the above-described opening 43 can be provided in the first blocking layer 4 as appropriate, and a plurality of openings 43 can also be provided according to the type of light. If a stereo camera is provided, two openings 43 are formed in the first blocking layer 4, and the antifog sheet 7 is attached to each opening 43, for example. Therefore, the second blocking layer 5 is also arranged according to the positions of the antifog sheets 7 and the openings 43.

Also, there is no particular limitation on the form of the opening 43. The opening 43 need not have a closed shape surrounded by the first blocking layer 4, or may have a shape in which a portion of the peripheral edge thereof is open.

7-5

Also, there is no particular limitation on the form and size of the blocking layers 4 and 5. The first blocking layer 4 need only be provided with at least the opening 43, and the second blocking layer 5 is formed so as to block a portion of the opening 43 and to adjust the shape and size of the imaging window. Therefore, the shapes and the like of the peripheral edge portions 41 and 51 can also be changed as appropriate. The peripheral edge portions 41 and 51 may be provided only on the first blocking layer 4 or the second blocking layer 5, for example.

7-6

The attachment angle θ (see FIG. 2) of the laminated glass (windshield) when being attached to a vehicle is not particularly limited, and is preferably 45 degrees or less relative to a vertical direction N, for example. The vertical direction N refers to a vertical direction relative to the installation surface when the vehicle is installed on a horizontal surface. Accordingly, because the windshield is not excessively inclined, it is possible to prevent extra light from entering the imaging window. However, the attachment angle θ may be larger than 45 degrees, and in this case, the shape of the imaging window can be adjusted by the second blocking layer.

7-7

Figure 14:
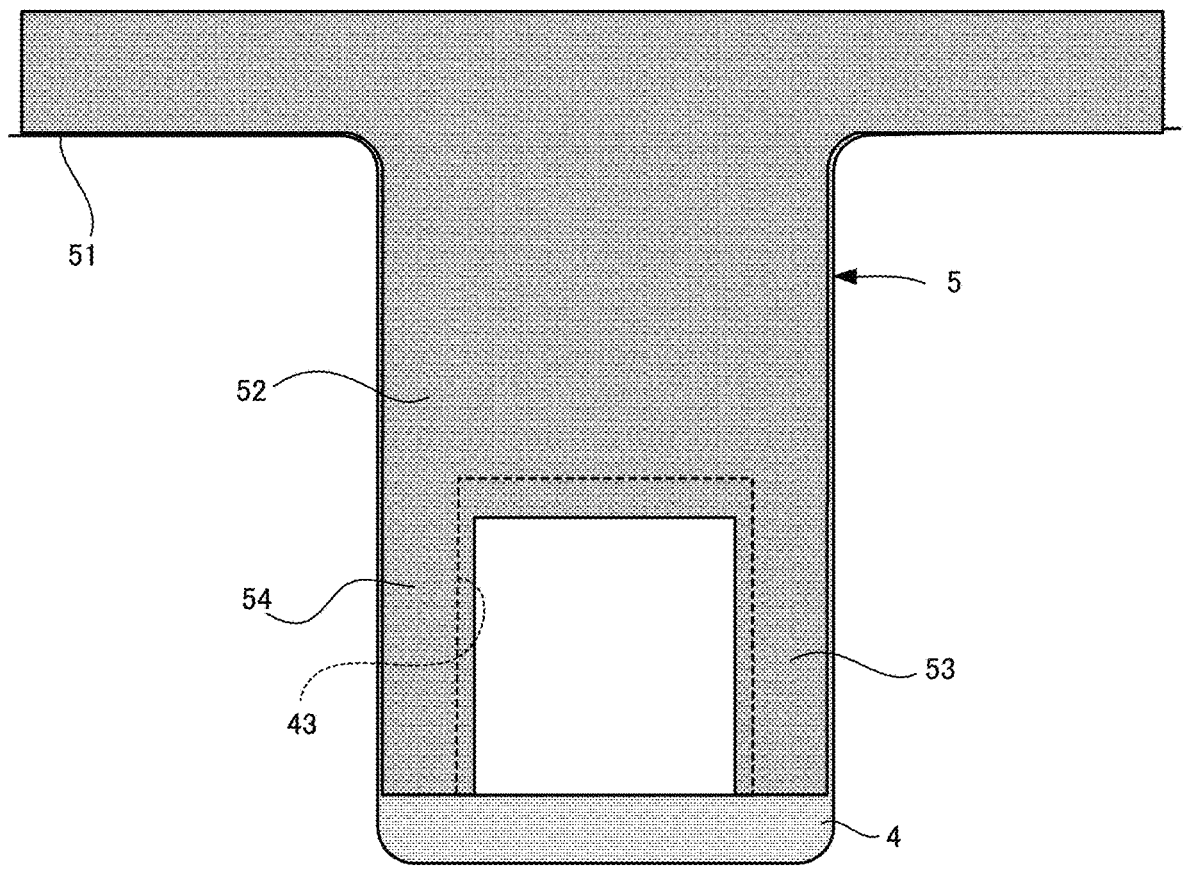
FIG. 14 is a partially enlarged plan view showing another example of the windshield as viewed from the vehicle interior side.

As described in the above-described embodiment, the lower edge of the extension portion 52 of the second blocking layer 5 is arranged below the upper edge of the opening 43 in the first blocking layer 4, thus suppressing overlapping of the regions of the glass plates 11 and 12 where warping occurs. However, in addition to the upper portion of the opening in the first blocking layer, the remaining portion can be covered by the second blocking layer. As shown in FIG. 14, a configuration may be adopted in which the protrusions 53 and 54 as shown in FIG. 11 are provided on the two sides of the lower edge of the extension portion 52 of the second blocking layer 5, and the two protrusions 53 and 54 cover the two side portions (regions slightly inward of the inner edges on the two sides) of the opening 43 in the first blocking layer 4, for example. Accordingly, it is possible to inhibit the overlapping of warping occurring on the two side portions of the opening 43 in the glass plates 11 and 12.

Figure 15:
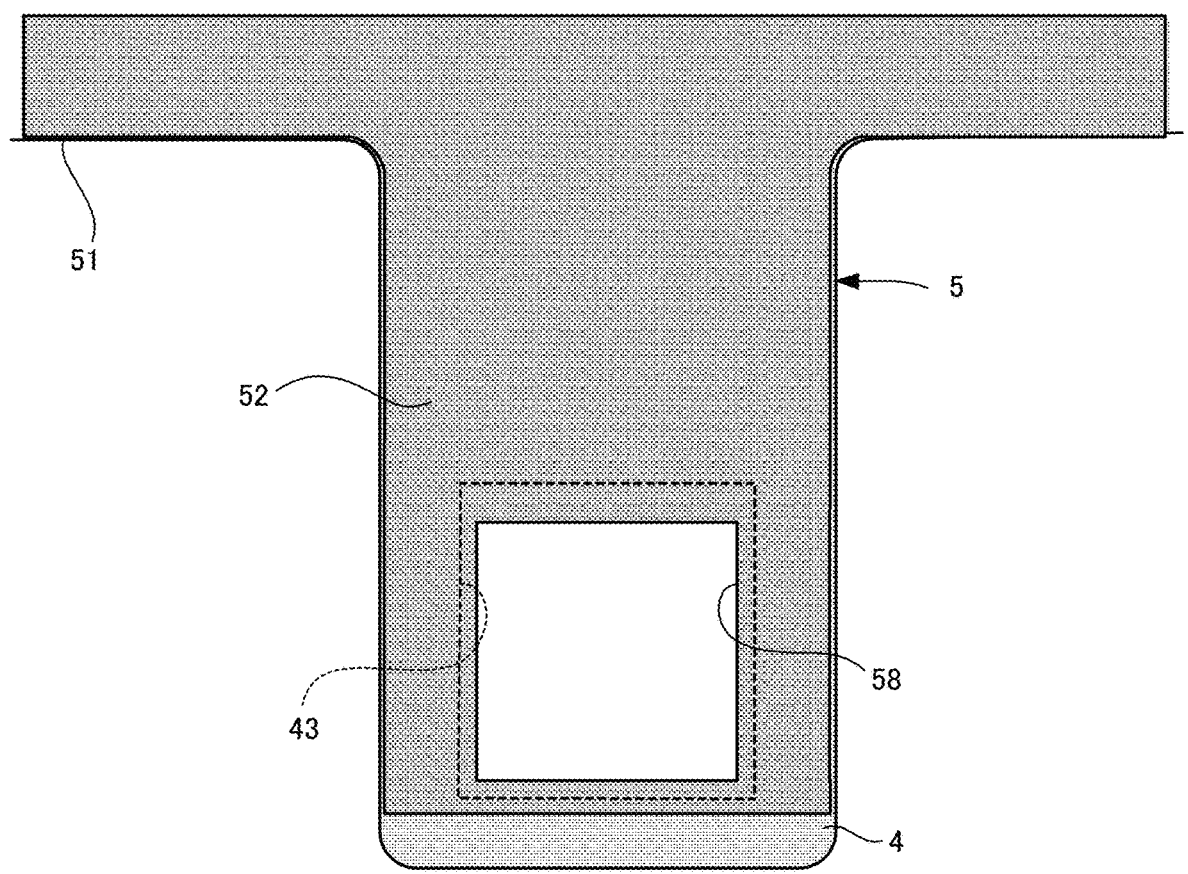
FIG. 15 is a partially enlarged plan view showing another example of the windshield as viewed from the vehicle interior side.

Also, as shown in FIG. 15, a configuration may be adopted in which the extension portion 52 of the second blocking layer 5 is extended downward so as to cover the opening 43 in the first blocking layer 4, and an opening 58 is also formed in the extension portion 52, an inner peripheral edge of the opening 58 in the extension portion 52 being located inward of the inner peripheral edge of the opening 43 in the first blocking layer 4. Accordingly, it is possible to inhibit the overlapping of warping over the entire periphery of the opening 43 in the glass plates 11 and 12.

As described above, although it is possible to suppress the amount of warping in the laminated glass 10 overall by placing the second blocking layer 5 on a portion of the opening 43 in the first blocking layer 4, the region covered by the second blocking layer 5 can be changed as appropriate depending on specifications such as the size of the imaging window required. Therefore, although it is preferable to cover the upper portion of the opening 43 with the second blocking layer 5 as described in the above-described embodiment, the position to be covered is not particularly limited. That is, at least one of the upper portion, two side portions, and lower portion of the opening 43 need only be covered by the second blocking layer 5. Therefore, only the two side portions or the lower portion of the opening 43 may also be covered by the second blocking layer.

7-8

As described above, if there is a difference in the linear expansion coefficient (coefficients of thermal expansion) between the glass plates 11 and 12 and the blocking layers 4 and 5 made of a ceramic material, warping occurs in the glass plates 11 and 12. However, such warping can be dealt with as follows. First, because convergent light enters the camera of the imaging device 2, the region of light rays entering the camera from the outside decreases as the distance from the camera decreases. Therefore, if an image is warped at a position away from the camera, the influence of warping on the image is reduced due to the image being larger than in a case where an image is warped at a closer position. Because of this, it is conceivable that warping that occurs in the imaging window is less likely to influence warping in an image obtained when the imaging window is located farther from the camera.

Although, if the blocking layers 4 and 5 are made of a ceramic material, the outer glass plate 11 and the inner glass plate 12 may be warped, it is preferable that a glass plate with a larger amount of warping is used as the outer glass plate, from the above-described viewpoint. Also, if the angle of visibility extends downward from above, it is preferable that a glass plate with larger warping is used as the outer glass plate 11 on the upper side of the imaging window because an image of a distant subject is captured on the upper side of the imaging window.

7-9

Although the windshield provided with the bracket 6 and the antifog sheet 7 has been described in the above-described embodiment, there is no limitation thereto. That is, in order to resolve the above-described issues with the present invention, a windshield that is not provided with the bracket 6 or the antifog sheet 7, that is, a windshield that includes at least the laminated glass 10, the first blocking layer 4, and the second blocking layer 5 and does not include the bracket 6 or the antifog sheet 7, is also included in the scope of the present invention.

7-10

The above-described shape of the bracket 6 is an example, and the shape thereof is not particularly limited as long as the bracket is attached to the first blocking layer 4 and the information acquisition device 2 is attachable to the bracket.

LIST OF REFERENCE NUMERALS

10 Laminated glass
11 Outer glass plate
12 Inner glass plate
13 Interlayer
4 First blocking layer
43 Opening
5 Second blocking layer
6 Bracket
7 Antifog sheet
71 Adhesive layer
72 Base film
73 Antifog layer

The invention claimed is:

1. A windshield on which an information acquisition device configured to acquire information from an outside of a vehicle by emitting and/or receiving light can be arranged, the windshield comprising:
   an outer glass plate;
   an inner glass plate;
   an interlayer arranged between the outer glass plate and the inner glass plate;
   a first blocking layer layered on a surface on a vehicle interior side of the inner glass plate; and
   a second blocking layer layered on a surface on a vehicle interior side of the outer glass plate;
   wherein the first blocking layer has an opening through which the light passes,
   the second blocking layer is layered at a position where the second blocking layer blocks an upper portion of the opening, and the second blocking layer and the opening form a path through which the light passes,
   a lowermost surface, which is projected within the opening in a direction normal to the opening, of the second blocking layer forms an upper end of the path, and
   a lower end of the opening forms a bottom end of the path.

2. The windshield according to claim 1,
   wherein the second blocking layer is formed extending in an up-down direction, and
   the second blocking layer blocks a portion of the opening such that the shortest distance A between an upper side of the inner glass plate and an upper edge of the opening and the shortest distance B between the upper side of the inner glass plate and a lower edge of the second blocking layer satisfy A<B.

3. The windshield according to claim 1,
   wherein the second blocking portion is layered at a position where it blocks an upper portion of the opening and at least a portion of two side portions of the opening.

4. The windshield according to claim 1,
   wherein the second blocking portion is layered at a position where it blocks an inner peripheral edge portion of the opening.

5. The windshield according to claim 1, further comprising
an antifog sheet attached to the surface on the vehicle interior side of the inner glass plate;
wherein the antifog sheet is attached so as to cover at least a portion of the opening.

6. The windshield according to claim 1,
wherein the first blocking layer has an extension portion that extends downward from a vicinity of an upper side of the inner glass plate, and a lower end portion of the extension portion is provided with the opening, and
the second blocking layer is formed so as to be layered at a position corresponding to the extension portion and so as to block an upper portion of the opening.

7. The windshield according to claim 5,
wherein the antifog sheet is attached so as to overlap with at least a portion of a peripheral edge of the opening, and
the second blocking layer is layered at least at a position corresponding to the portion where the peripheral edge of the opening and the antifog sheet overlap with each other.

8. The windshield according to claim 7,
wherein the opening is formed into a rectangular shape, and
the antifog sheet is attached so as to overlap with at least an upper edge of the opening.

9. The windshield according to claim 5,
wherein the opening is formed into a rectangular shape, and
the antifog sheet is arranged so as not to be in contact with two side edges of the opening.

10. The windshield according to claim 5,
wherein the opening is formed into a rectangular shape, and
the antifog sheet is attached so as to overlap with at least one of two side edges of the opening,
the second blocking layer includes a pair of protruding portions that extend along the two sides of the opening, and
the protruding portions are provided at positions corresponding to a portion where the antifog sheet and at least one of the two side edges of the opening overlap with each other.

11. The windshield according to claim 1,
wherein the first blocking layer has an extension portion that extends downward from a vicinity of an upper side of the inner glass plate, and a lower end portion of the extension portion is provided with the opening, and
a width of the second blocking layer is less than or equal to a width of the extension portion of the first blocking layer.

12. The windshield according to claim 1, further comprising
a bracket to which the information acquisition device is attachable and that is attached to the surface on the vehicle interior side of the inner glass plate,
wherein the bracket is formed into a frame shape having a through-hole portion surrounding the opening, and
the antifog sheet is arranged in the through-hole portion.

13. The windshield according to claim 5,
wherein the antifog sheet includes
a base member,
an antifog layer layered on one surface of the base member, and
an adhesive layer that is layered on another surface of the base member and is attached to the inner glass plate.

14. The windshield according to claim 1,
wherein an attachment angle of the windshield attached to a vehicle relative to a vertical direction is 45 degrees or less.

15. The windshield according to claim 1,
wherein linear expansion coefficients of the glass plates and linear expansion coefficients of the blocking layers are different from each other, and
the amount of warping occurring in a vicinity of an edge portion of the first blocking layer in the inner glass plate is smaller than the amount of warping occurring in a vicinity of an edge portion of the second blocking layer in the outer glass plate.

16. The windshield according to claim 1, wherein the opening is defined between a first surface and a second surface of the first blocking layer, a lowermost end of the second blocking layer is positioned between said first surface and a lowermost surface of the first blocking layer, and the path is defined between said lowermost surface of the second blocking layer and said second surface of the first blocking layer.

* * * * *